(12) United States Patent
Habashi et al.

(10) Patent No.: US 7,812,068 B2
(45) Date of Patent: Oct. 12, 2010

(54) RECORDING INK, INKJET RECORDING METHOD AND INKJET RECORDING APPARATUS USING THE SAME

(75) Inventors: Hisashi Habashi, Isehara (JP); Kiyofumi Nagai, Machida (JP); Akiko Bannai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 657 days.

(21) Appl. No.: 11/659,851

(22) PCT Filed: Aug. 4, 2005

(86) PCT No.: PCT/JP2005/014712

§ 371 (c)(1),
(2), (4) Date: May 11, 2007

(87) PCT Pub. No.: WO2006/016636

PCT Pub. Date: Feb. 16, 2006

(65) Prior Publication Data

US 2008/0138519 A1   Jun. 12, 2008

(30) Foreign Application Priority Data

Aug. 9, 2004 (JP) .............................. 2004-232547
Jul. 8, 2005 (JP) .............................. 2005-199813

(51) Int. Cl.
*C09D 13/00* (2006.01)
(52) U.S. Cl. .................. 523/160; 523/161; 524/543; 106/31.6; 347/100; 347/86; 346/78; 428/195.1
(58) Field of Classification Search .............. 523/160, 523/161
See application file for complete search history.

(56) References Cited

U.S. PATENT DOCUMENTS

| 4,155,767 | A | 5/1979 | Specht et al. |
| 6,071,334 | A | 6/2000 | Wider et al. |
| 7,094,813 | B2 * | 8/2006 | Namba et al. ............... 523/160 |
| 2002/0096085 | A1 | 7/2002 | Gotoh et al. |
| 2003/0061966 | A1 | 4/2003 | Brown et al. |
| 2003/0107632 | A1 | 6/2003 | Arita et al. |
| 2006/0176349 | A1 | 8/2006 | Nagai et al. |
| 2007/0197685 | A1 | 8/2007 | Aruga et al. |
| 2007/0221078 | A1 | 9/2007 | Namba et al. |
| 2007/0221079 | A1 | 9/2007 | Aruga et al. |
| 2008/0070008 | A1 | 3/2008 | Namba et al. |
| 2008/0248260 | A1 | 10/2008 | Kojima et al. |
| 2009/0114121 | A1 | 5/2009 | Morohoshi et al. |

FOREIGN PATENT DOCUMENTS

| EP | 1 262 529 A1 | 12/2002 |
| EP | 1 462 495 A1 | 9/2004 |
| EP | 1 473 338 A1 | 11/2004 |
| JP | 9-111166 | 4/1997 |
| JP | 9-157565 | 6/1997 |
| JP | 9-183931 | 7/1997 |
| JP | 9-183932 | 7/1997 |
| JP | 9-217030 | 8/1997 |
| JP | 9-241565 | 9/1997 |
| JP | 9-279067 | 10/1997 |
| JP | 9-286939 | 11/1997 |
| JP | 10-46082 | 2/1998 |
| JP | 10-46092 | 2/1998 |
| JP | 10-60327 | 3/1998 |
| JP | 10-273610 | 10/1998 |
| JP | 10-279851 | 10/1998 |
| JP | 10-298462 | 11/1998 |
| JP | 10-298467 | 11/1998 |
| JP | 10-316918 | 12/1998 |
| JP | 10-338829 | 12/1998 |
| JP | 11-217528 | 8/1999 |
| JP | 11-256083 | 9/1999 |
| JP | 11-323226 | 11/1999 |
| JP | 2000-7962 | 1/2000 |
| JP | 2000-7963 | 1/2000 |
| JP | 2000-26775 | 1/2000 |
| JP | 2000-44852 | 2/2000 |
| JP | 2000-53897 | 2/2000 |
| JP | 2000-53898 | 2/2000 |
| JP | 2000-53899 | 2/2000 |
| JP | 2000-53900 | 2/2000 |
| JP | 2000-95983 | 4/2000 |
| JP | 3065950 | 5/2000 |
| JP | 2000-191967 | 7/2000 |
| JP | 2000-191968 | 7/2000 |
| JP | 2000-191972 | 7/2000 |
| JP | 2001-262025 | 9/2001 |
| JP | 2002-337449 | 11/2002 |
| JP | 2003-003100 | * 1/2003 |
| JP | 2003-96345 | 4/2003 |
| JP | 2003-213179 | 7/2003 |
| JP | 2003-335987 | 11/2003 |
| JP | 2004-75767 | 3/2004 |
| WO | WO 03/066752 | * 8/2003 |
| WO | WO 03/066752 A1 | 8/2003 |

OTHER PUBLICATIONS

Machine translation of JP 2003-003100.*

* cited by examiner

*Primary Examiner*—Vasu Jagannathan
*Assistant Examiner*—Doris L Lee
(74) *Attorney, Agent, or Firm*—Oblon, Spivak, McClelland, Maier & Neustadt, L.L.P.

(57) ABSTRACT

The invention provides a recording ink containing a colorant, a wetting agent, a surfactant, a penetrating agent, and water, wherein when the specified moisture evaporation rate of the recording ink is less than 30% the specified viscosity elevating rate of the recording ink is 10 or less; when the moisture evaporation rate is 30% to 50%, there is a point at which the viscosity elevating rate is more than 500; and when the moisture evaporation rate is less than 30%, the average particle diameter of the colorant in the recording ink is two times or less the initial average particle diameter of the colorant before the moisture evaporation test of the recording ink.

15 Claims, 8 Drawing Sheets

| Paper surface temp. | 25°C | 35°C | 45°C | 60°C |
|---|---|---|---|---|
| Ink set of ink of Ex. 1 and ink of Ex. 2 | | | | |
| Evaluation | D | C | B | A |
| Ink set of ink of Comp. Ex. 1 and ink of Comp. Ex. 2 | | | | |
| Evaluation | D | D | D | D |

RECORDING INK, INKJET RECORDING METHOD AND INKJET RECORDING APPARATUS USING THE SAME

TECHNICAL FIELD

The present invention relates to a recording ink having advantageous delivering stability when used in inkjet recording apparatuses even equipped with a heating unit, and relates to an inkjet recording method and inkjet recording apparatus using the recording ink which may provide images with excellent quality on plain paper and adapted to high-speed printing.

BACKGROUND ART

Inkjet recording apparatuses are widely utilized for image recoding apparatuses such as printers, facsimiles and copying machines. Such inkjet recording apparatuses are utilized for recording by delivering an ink from a recording head to a recording medium such as paper and has various advantages that a highly fine image can be recorded at higher speed, that the running cost is lower, that the inkjet recording apparatuses generate less noise, and that recording of color images is carried out easily using inks having various colors.

Such inks for inkjet recording typically contains water mainly, and also a colorant a wetting agent e.g. glycerin for preventing clogging of the ink, a penetrating agent for controlling the penetrability of the ink into the recording paper, and other additives.

Conventionally, papers exclusively utilized for purpose of inkjet printing process (hereinafter referring to as "inkjet paper") have been developed, which have characteristics of improved absorption property, fixing ability of coloring component onto paper surface, and function to protect the coloring component so as to promote the infiltration and fixing of the liquid ink onto recoding media, in inkjet recording on the base of aqueous ink. However, the inkjet paper is produced by subjecting a made paper after the papermaking to various coating steps, thus the cost thereof is high and the inkjet paper comprises various processing agents, thus it has poor recycling properties in comparison with plain paper. Therefore it is desired that a satisfactory image quality can be obtained on the plain paper.

Since the plain paper has poorer ink absorption properties than those of the inkjet paper and cannot assist the ink function, like the inkjet paper, by using the plain paper, there are caused disadvantages such as (1) the cause of the feathering of the ink, (2) the cause of the bleeding of the ink, (3) the lowering of the ink density, (4) the lowering of the color developing properties of the ink, (5) the lowering of the water resistance of the ink, (6) the lowering of the light resistance of the ink, (7) the lowering of the gas resistance of the ink, (8) the lowering of the fixing properties of the ink, (9) the cause of a cock-ring curl and (O) the cause of the show-through of the ink.

Therefore, solving these disadvantages is an important task for the inkjet recording on the plain paper.

Recently, the dispersibility of the pigment has been improved and the particles of the pigment have been pulverized, then such a pigment has been frequently used for an inkjet ink. For example, the above-noted disadvantages (5) to (7) can be improved by using a pigment, such as a carbon black. However, the pigment has poorer density and poorer color-developing properties than those of a dye and is poor in the reliability, such as delivering stability; shelf stability for a long term and redispersibility. Therefore, when the pigment is used as a colorant, it becomes a task to improve the reliability of the recording ink.

Various inks for the inkjet recording using an emulsion of colored polymer particles, particularly of polyester or vinyl polymer particles are reported for solving the above-noted disadvantages (see Patent literatures 1 to 30). An ink comprising a colorant-involved resin dispersion in which a colorant is involved in a water-insoluble dispersible resin is disclosed in these patent literatures. Further, when a color organic pigment is used as a colorant, a conventional ink composition is more excellent in the image density and color reproducibility on the plain paper than a pigment ink using a water-soluble dispersing agent, however is poorer than a dye ink.

The compatibility between the improvement of the reliability and the improvement of the image quality has been studied as other treatments of the inkjet ink than the above-noted treatments. Many inkjet inks are so designed that the viscosity elevation of the ink is suppressed as much as possible for preventing the clogging of the head nozzle. For example, proposed is an ink in which by suppressing the viscosity of an ink which is concentrated by two times from an original ink within 10 times that of the original ink or by suppressing the particle diameter of an ink which is concentrated by two times from an original ink within 3 times that of the original ink, an agglomerated pigment can prevent the suppressing of the spread of the ink and can prevent the void of the ink (see Patent literature 31). However, by this proposed ink, an image having a high quality can be difficulty formed on the plain paper.

Also, proposed is an ink in which a liquid is a residual component of the ink after a volatile component of the ink is evaporated and the viscosity of the liquid is within 10 times that of the original ink (see Patent literature 32). However, this ink is a dye ink and while this ink has high reliability the image formed using this ink on the plain paper has a poor quality.

Further, proposed is an ink in which the viscosity of the ink in which water in the ink is evaporated at 60° C. is 600 times or less that of the original ink (see Patent literature 33). However, the proposed ink is also a dye ink and while the reliability of the ink and the durability of the image quality are balanced by incorporating a water-soluble polymer in the composition of the ink, this ink is problematic in water resistance.

It is also proposed that an ink having a high viscosity (e.g., 5 mPa·s to 15 mPa·s) is required for securing a high image quality (see Patent literature 34). In this proposal, it is described that for securing the reliability of the ink, it is advantageous that not only the initial evaporating rate of the ink is controlled, but also a specific compound as a viscosity-controlling agent for controlling the viscosity of the ink is incorporated in the composition of the ink, and there can be mentioned that this proposal is a solving method of the above-noted disadvantages (3) and (4) in the case of using a pigment. However in this proposal, there is no description with respect to the stability of the particle diameter of the used pigment and there is described only that the ink has reliability after the ink is left to stand for 24 hours. However, the described ink composition is poor in the reliability of the ink depending on the composition of the inkjet head from which the ink is delivered and on the size of the nozzle diameter, when the ink is left to stand further for a longer term.

As described above, an ink having a high viscosity is necessary to be used for securing a high printing quality at a high speed. However, the reliability of the ink having a high viscosity can be difficulty secured and such an ink is not made full use thereof.

Further, as a method for improving the image quality, the method for solving the above-noted disadvantages (1), (2) and (8) to (10) with respect to the plain paper has been attempted by elevating the drying rate of the ink without lowering an ink attaching amount.

Examples of the method for elevating the drying rate include (i) a method in which a volatile component is incorporated in the composition of the ink and (ii) a method in which the printer is equipped with a drying unit.

In the method (i), while the drying properties of the ink can be easily improved, the meniscus of the ink nozzle of the head is also easily dried and the viscosity of the ink is elevated, thus the stable delivery of the ink is reversely affected. Further, the printing environment is impaired, since a volatile component is an organic compound, thus the using of an aqueous ink loses the advantage thereof. With respect to the on-demand inkjet system using a pigment, there are various disadvantages from the viewpoint of the reliability of the ink.

The method (ii) becomes practicable by incorporating a heater in the image forming apparatus, however there is also such a disadvantage that the apparatus becomes complicated. As a specific method for heating the ink for drying the ink, such methods are studied as a method in which the film platen is heated and the recording medium is heated through a conduction of the heat (see Patent literatures 35 to 39), a method in which the ink is heated using a infrared light (see Patent literature 40) and a method in which such a fixing apparatus is used as a fixing apparatus using a heating roller (see Patent literatures 41 and 42).

However, in the method using the platen, a disadvantage is caused wherein the thermal conductivity to the recording medium is not uniform, in the method using a infrared light, a disadvantage is caused wherein a large amount of the electric power is necessary and in the method using the fixing apparatus, a disadvantage is caused wherein the apparatus becomes in a large scale. Further by heating a recording medium before or after the printing, not only the recording medium, but also the head surface is heated through a waste heat or a radiant heat Further, by heating the head surface, the drying of the meniscus is promoted and the delivering stability of the ink is lowered. It is also proposed that the affection of the heat can be suppressed by using the head surface as a heat reflecting surface (see Patent literature 43).

However, there is no description with respect to the ink in this proposal and from this fact, this proposal can be mentioned to have not satisfactory reliability.

Thus, the inkjet printer using an aqueous ink and equipped with a thermal fixing unit has a complicated mechanism and has disadvantage in the reliability of the ink However, many types of the inkjet printer are brought on the market for obtaining an advantage of improving the image quality during a high-speed printing or both-side printing. However, an on-demand inkjet printer using pigment inks as full-color inks which is equipped with a thermal fixing unit has yet various problems with respect to the reliability of the ink and the practical application thereof is delayed.

Thus, while using the process of the thermal fixing leads to solving the above-noted disadvantages (1), (2) and (8) to (10), the reliability of the ink remains as a problem. Further, while using a dye ink in combination with a pigment ink having a high viscosity leads to solving the above-noted disadvantages (3) to (7) with respect to the plain paper, a disadvantage is caused wherein the delivering stability of the ink is lowered in comparison with the case wherein the ink comprising only a dye is used and the reliability of the printer is extremely lowered.

Patent literature 1 Japanese Patent Application Laid-Open (JP-A) No. 2000-191972
Patent literature 2 JP-A No. 2000-191968
Patent literature 3 JP-A No. 2000-191967
Patent literature 4 JP-A No. 2000-53900
Patent literature 5 JP-A No. 2000-53899
Patent literature 6 JP-A No. 2000-53898
Patent literature 7 JP-A No. 2000-53897
Patent literature 8 JP-A No. 2000-44852
Patent literature 9 JP-A No. 2000-26775
Patent literature 10 JP-A No. 2000-7963
Patent literature 11 JP-A No. 2000-7962
Patent literature 12 JP-A No. 9-241565
Patent literature 13 JP-A No. 9-217030
Patent literature 14 JP-A No. 9-183932
Patent literature 15 JP-A No. 9-183931
Patent literature 16 JP-A No. 9-286939
Patent literature 17 JP-A No. 9-157565
Patent literature 18 JP-A No. 10-46082
Patent literature 19 JP-A No. 10-46092
Patent literature 20 JP-A No. 10-60327
Patent literature 21 JP-A No. 10-273610
Patent literature 22 JP-A No. 10-279851
Patent literature 23 JP-A No. 10-298462
Patent literature 24 JP-A No. 10-298467
Patent literature 25 JP-A No. 11-217528
Patent literature 26 JP-A No. 10-338829
Patent literature 27 JP-A No. 10-316918
Patent literature 28 JP-A No. 11-256083
Patent literature 29 JP-A No. 11-323226
Patent literature 30 Japanese Patent (JP-B) No. 3065950
Patent literature 31 JP-A No. 2002-337449
Patent literature 32 JP-A No. 2000-095983
Patent literature 33 JP-A No. 9-111166
Patent literature 34 JP-A No. 2001-262025
Patent literature 35 JP-A No. 55-69464
Patent literature 36 JP-A No. 55-84670
Patent literature 37 JP-A No. 58-12460
Patent literature 38 JP-A No. 62-130863
Patent literature 39 JP-A No. 62-130864
Patent literature 40 JP-A No. 57-120447
Patent literature 41 JP-A No. 3-169644
Patent literature 42 JP-A No. 6-184478
Patent literature 43 JP-A No. 11-123828

DISCLOSURE OF INVENTION

The object of the invention is to provide a recording ink with higher reliability even when the recording ink is combined with a pigment and a heating unit, and to provide an inkjet recording method and inkjet recording apparatus using the recording ink which are excellent in high quality of an image formed on a plain paper and in a correspondence to a high-speed printing.

The recording ink of the invention comprises a colorant, a wetting agent, a surfactant, a penetrating agent and water, wherein when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30% to 50%, there is a point at which the viscosity elevating rate is more than 500; and when the moisture evaporation rate is less than 30%, the average particle diameter of the colorant in the recording ink is two times or less the initial average particle diameter of the colorant before the moisture evaporation of the recording ink.

$$\text{Moisture evaporation rate}(\%) = [(W_A - W_B)/W_A] \times 100 \quad \text{<Numerical formula 1>}$$

wherein $W_A$ represents an initial mass (g) of the recording ink before the moisture evaporation and $W_B$ represents a mass (g) of the recording ink after the moisture evaporation $$\text{Viscosity elevating rate} = V_B/V_A \quad \text{<Numerical formula 2>}$$

wherein $V_A$ represents an initial viscosity (mPa·s) of the recording ink before the moisture evaporation and $V_B$ represents a viscosity (mPa·s) of the recording ink after the moisture evaporation.

With respect to the recording ink of the invention, such aspects are preferred as an aspect in which the colorant comprises pigment fine particles, an aspect in which the colorant comprises pigment fine particles having at least one hydrophilic group in the surface thereof and exhibits at least one of water-dispersibility and water-solubility in the absence of a dispersing agent, an aspect in which the colorant is a polymer emulsion in which polymer fine particles comprise any one of water-insoluble and water-slight soluble pigment fine particles, an aspect in which the wetting agent is at least two types of polyhydric alcohols having an equilibrated water content of 25% by mass or more in an atmosphere having a temperature of 20° C. and a relative humidity of 60% an aspect in which one of polyhydric alcohols is glycerin and the content of glycerin in the wetting agent is 50% by mass or less, based on the total mass of the wetting agent, an aspect in which the penetrating agent is a polyol having a solubility of 0.2% by mass to 5.0% by mass in water having a temperature of 20° C., an aspect in which the recording ink comprises 0.5% by mass to 15 by mass of the colorant 10% by mass to 50% by mass of the wetting agent 0.01% by mass to 5% by mass of the surfactant and 0.1% by mass to 5% by mass of the penetrating agent an aspect in which the surfactant is a nonionic surfactant and an aspect in which the nonionic surfactant is any one of the compounds represented by the following formulas:

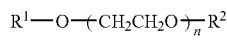

wherein $R^1$ represents any one of a carbon chain having a carbon number of 6 to 14 which may be branched and a perfluoroalkyl chain having a carbon number of 6 to 14; $R^2$ represents any one of a hydrogen atom and a carbon chain having a carbon number of 1 to 4 which may be branched; and "n" is an integer of 5 to 20,

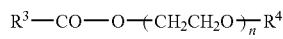

wherein $R^3$ represents a carbon chain having a carbon number of 6 to 14 which may be branched, $R^4$ represents any one of a hydrogen atom and a carbon chain having a carbon number of 1 to 4 which may be branched; and "n" is an integer of 5 to 20,

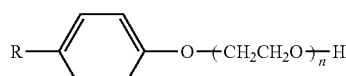

wherein R represents a carbon chain having a carbon number of 6 to 14 which may be branched; and "n" is an integer of 5 to 20,

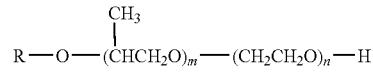

wherein R represents a carbon chain having a carbon number of 6 to 14 which may be branched; "m" is an integer of 5 to 10; "n" is an integer of 5 to 20; and the propylene glycol chain and the ethylene glycol chain may be produced according to a block polymerization or a random

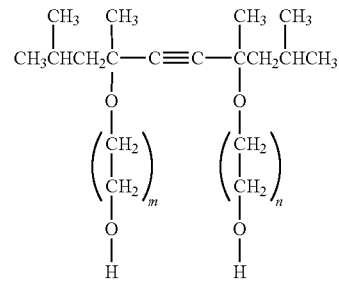

wherein "m" and "n" are respectively an integer of 5 to 20.

The inkjet recording method of the invention comprises delivering the recording ink of the invention from a nozzle and recording by attaching the recording ink to a printing region or non-printing region of a recording medium, wherein before the moisture evaporation rate of the recording ink in the near of the nozzle is more than 30%, the recording ink is delivered from the nozzle.

In the inkjet recording method of the invention, such an aspect is preferred as an aspect in which the recording is performed by at least one of heating the recording medium after the recording ink is attached to the recording medium, attaching the recording ink to the recording medium after the recording medium is heated, and attaching the recording ink to the recording medium while heating the recording medium.

The inkjet recording apparatus of the invention comprises a recording head having a nozzle delivering the recording ink to a recording medium and a heating unit configured to heat the recording medium, wherein the inkjet recording apparatus performs the recording in the recording medium by the inkjet recording method of the invention.

The ink cartridge of the invention comprises the recording ink of the invention held in a container.

The ink record of the invention comprises an image formed in a recording medium using the recording ink of the invention.

BEST MODE FOR CARRYING OUT THE INVENTION

Recording Ink

Figure 1:
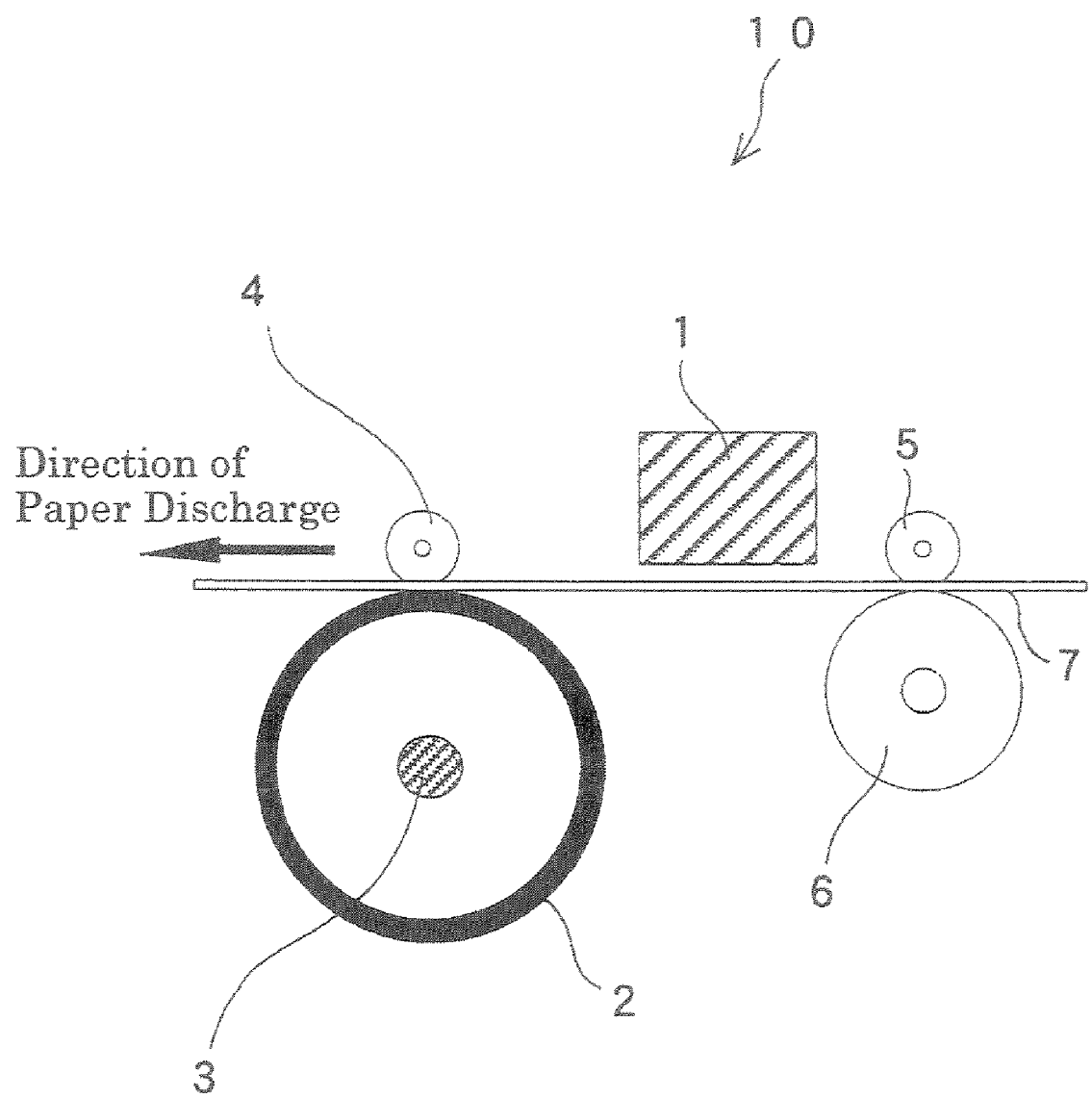
FIG. 1 is a view schematically showing an example of the composition of the inkjet recording apparatus according to the first embodiment of the invention.

The recording ink of the invention is a recording ink for the inkjet which is used for the inkjet recording apparatus equipped with a heating unit configured to heat a recording medium and comprises a colorant, a wetting agent, a surfactant, a penetrating agent, water and optionally other components.

With respect to the above-noted recording ink, when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30 to 50%, there appears a point at which the viscosity elevating rate of the recording ink is more than 500; and when the moisture evaporation rate of the recording ink is less than 30%, the average particle diameter of the colorant is two times or less the initial average particle diameter of the colorant before the moisture evaporation of the recording ink.

Moisture evaporation rate(%)=[($W_A-W_B$)/$W_A$]×100       <Numerical formula 1> wherein $W_A$ represents an initial mass (g) of the recording ink before the moisture evaporation and $W_B$ represents a mass (g) of the recording ink after the moisture evaporation Viscosity elevating rate=$V_B/V_A$       <Numerical formula 2> wherein $V_A$ represents an initial viscosity (mPa·s) of the recording ink before the moisture evaporation and $V_B$ represents a viscosity (mPa·s) of the recording ink after the moisture evaporation.

When the moisture evaporation rate of the recording ink is less than 30%, the viscosity elevating rate of the recording ink is preferably 8 or less more preferably 5 or less.

When the moisture evaporation rate is 30% to 50%, there appears a point at which the viscosity elevating rate of the recording ink is preferably more than 1000, more preferably more than 2,000.

When the moisture evaporation rate of the recording ink is less than 30%, the average particle diameter of the colorant is preferably 1.8 times or more preferably 1.5 times or less the initial average particle diameter of the colorant.

The recording ink used for the evaluation of the recording ink is preserved in a closed-top container in which an amount of the moisture evaporation for 3 months is less than 1%, based on the initial mass of the recording ink and in which the changing rate of the viscosity of the recording ink from a week and the changing rate of the particle diameter of the colorant for a week are within the range of −5% to 5%. The recording ink is preferably used within 3 months after the production thereof.

In the invention, the viscosity elevating rate of the recording ink according to the moisture evaporation of the recording ink contributes largely to the drying rate of the recording ink. With respect to the recording ink in which when the moisture evaporation rate is 50% or less, there is a point at which the viscosity elevating rate is more than 500, the amount of the moisture evaporation of the recording ink until the recording ink becomes in a dry state, is less than the amount of the moisture evaporation of a recording ink which does not exhibit the above-noted properties until a recording ink becomes in a dry state, thus the recording ink which exhibits the above-noted properties can be caused to become satisfactorily in a dry state by the heating at lower temperatures.

With respect to even the recording ink which exhibits the above-noted properties, by the composition of the recording ink in which not only the viscosity elevating rate is 10 or less when the moisture evaporation rate is 30 or less, but also when the moisture evaporation rate is 30 or less, the average particle diameter of the colorant in the recording ink is 2 times or less the initial average particle diameter of the colorant, the delivering reliability of the recording ink can be secured. As a result, even though the composition of the recording ink uses a pigment, the compatibility between satisfactory reliability and satisfactory image quality can be obtained in a combination of the above-noted ink composition and a heating unit.

Here, the average particle diameter means an average particle diameter at the volume cumulative percent of 50% The average particle diameter at the volume cumulative percent of 50% can be measured according to the dynamic light scattering method i.e. Doppler scattered-light analysis comprising: measuring the change of the vibration number or frequency of the light returned from the particles i.e. back-scattered light from the vibration number of the irradiated laser light by irradiating a laser light to particles moving in the "Brownian Motion" in the recording ink; and obtaining the particle diameter from the above-measured change.

For producing a recording ink which exhibits the above-noted preferred properties, either pigment fine particles or a polymer emulsion is necessary to be used as the colorant, wherein the pigment fine particles are rendered water-dispersible without a dispersing agent by subjecting the pigment fine particles to a treatment by which at least one type of hydrophilic groups is bonded to the surface of the pigment fine particles directly or through another group and the polymer emulsion is a polymer emulsion in which a water-insoluble or water-slight soluble colorant is incorporated in polymer fine particles. When such a colorant other than the above-noted colorant is used, as a pigment produced by dispersing using only a surfactant or a pigment produced by dispersing using only a water-soluble resin, the increase of the average particle diameter of the colorant according to the moisture evaporation of the recording ink becomes marked, thus there is a fear for impairing the delivering reliability of the recording ink.

Further, since moderating the moisture evaporation rate may lead to the improvement of delivering reliability in the recording ink, it is preferred that the recording ink comprises 10% by mass to 50% by mass of a wetting agent and the wetting agent comprises at least two types of polyhydric alcohols having a equilibrated water content of 25% by mass or more, measured in an atmosphere having a temperature of 20° C. and a relative humidity of 60%. The equilibrated water content is more preferably 30% by mass or more, still more preferably 35% by mass or more.

One type of the above-noted polyhydric alcohols is preferably glycerin and the content of glycerin is preferably 50% by mass or less, more preferably 20% by mass to 50% by mass, still more preferably 25% by mass to 40% by mass, based on the total mass of the wetting agent.

In order to improve the quality of printed images as well as to satisfy the conditions of the composition of the recording ink, it is preferred that the recording ink comprises 0.5% by mass to 15% by mass of a colorant, 001% by mass to D by mass of a surfactant and 0.1% by mass to 5% by mass of a penetrating agent.

Examples of the component of the composition of the recording ink include colorants, wetting agents, surfactants and penetrating agents. The combination of the components is important for prescribing the composition of the recording ink of the invention Explanations are given with respect to the components in the following.

The colorant comprises mainly a pigment from the viewpoint of weathering properties of the recording ink and may simultaneously comprise a dye for controlling the tone of the recording ink so long as the weathering properties of the recording ink is not impaired. Examples of the pigment include inorganic pigments and organic pigments.

Examples of the inorganic pigments include titanium oxide, iron oxide, calcium carbonate, barium sulfate, aluminum hydroxide, barium yellow, cadmium red chrome yellow, and a carbon black produced by a conventional method, such as a contact method, a furnace method and a thermal method.

Examples of the organic pigments include azo pigments (e.g., azo lakes, insoluble azo pigments, condensed azo pigments and chelate azo pigments), polycyclic pigments (e.g., phthalocyanine pigments, perylene pigments, perynone pigments, anthraquinone pigments, quinacridone pigments, dioxadine pigments, indigo pigments, thioindigo pigments, isoindolinone pigments and quinophthalone pigments), dye chelates (e.g., basic dye chelates and acidic dye chelates), nitro pigments, nitroso pigments and aniline blacks. Among these pigments, most preferred are pigments having high affinity with water.

Specific examples of the black pigment include carbon blacks (C.I. Pigment Black 7), such as a furnace black, a lamp black, an acetylene black and a channel black; metals and metal compounds, such as copper, iron (C.I. Pigment Black 11) and titanium oxide; and organic pigments, such as an aniline black (C.I. Pigment Black 1).

Specific examples of the color pigment include C.I. Pigment Yellows 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153 and 183; C.I. Pigment Oranges 5, 13, 16, 17, 36, 43 and 51; C.I. Pigment Reds 1, 2, 3, 5, 17, 22, 23, 31, 38, 48:1, 48:2 (Permanent Red 2B (Cal), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violets 1 (Rhodamine Lake), 3, 5:1, 16, 19, 23 and 38; and C.I. Pigment Blues 1, 2, 15, 15:1, 15:2, 15:3 (Phthalocyanine Blue), 16, 17:1, 56, 60 and 63; C.I. Pigment Greens 1, 4, 7, 8, 10, 17, 18 and 36. Examples of other proper coloring pigments are described in the literature "The Color Index, third edition (edited by The Society of Dyers and Colourists, 1982)".

A preferred aspect of the pigment is pigment fine particles in which the surface thereof is modified in such a manner that at least one type of hydrophilic groups is bonded to the surface directly or through another group. Such pigment fine particles can be produced either according to a method in which a specific functional group (e.g., a sulfone group and a carboxyl group) is chemically bonded to the surface of the pigment fine particles, or according to a method in which the pigment fine particles are subjected to a wet oxidation treatment using a hypohalogenous acid and/or a salt thereof. Among the above-noted aspects of the pigment fine particles, most preferred is an aspect in which a carboxyl group is bonded to the surface of the pigment fine particles and the pigment fine particles are dispersed in water, because by modifying the surface of the pigment fine particles in such a manner that a carboxyl group is bonded to the surface of the pigment fine particles, not only the dispersing stability of the pigment fine particles is improved, but also a high printing quality of the recording ink can be obtained and the water resistance of the recording medium after the printing is more improved.

Further, since the recording ink comprising pigment fine particles in the above-noted aspect is excellent in redispersing properties after the drying of the recording ink, even when the printing is suspended for a long term and water in a recording ink present in the near of the nozzle of the inkjet head is evaporated, the clogging of the nozzle is not caused and after a simple cleaning of the nozzle, an advantageous printing can be easily restarted. In addition, particularly when the above-noted self-dispersible pigment is used in combination with the below-described surfactant and penetrating agent, the self-dispersible pigment exhibits a large synergism, thus an image having higher reliability and higher image quality can be obtained.

In addition to pigment fine particles in the above-noted aspect, a polymer emulsion in which a pigment is incorporated in polymer fine particles can be also used. The polymer emulsion in which a pigment is incorporated in polymer fine particles means a polymer emulsion in which a pigment is encapsulated in polymer fine particles and/or a polymer emulsion in which a pigment is adsorbed to the surface of polymer fine particles. In the above-noted polymer emulsion, it is not always necessary that all of the pigment is encapsulated and/or adsorbed and so long as the effect of the invention is not impaired, the pigment may be dispersed in the polymer emulsion.

Examples of the polymer which can form the above-noted polymer emulsion include vinyl polymers, polyester polymers and polyurethane polymers. Among them, vinyl polymers and polyester polymers are most preferred. These polymers are described in detail in the patent literatures, such as EP-A Nos. 2000-53897 and 2001-139849.

As the colorant, the pigment may be used not only individually, but also in combination with the following dyes.

Specific examples of acid dyes and food dyes include C.I. Acid Yellows 1, 23, 42, 44, 79 and 142; C.I. Acid Reds 1, 8, 13, 14, 18, 26, 27, 35, 37, 42, 52, 82, 87, 89, 92, 97, 106, 111, 114, 115, 134, 186, 249, 254 and 289; C.I. Acid Blues 9, 29, 45, 92 and 249; C.I. Acid Blacks 1, 2, 7, 24, 26 and 94; C.I. Food Yellows 2, 3 and 4; C.I. Food Reds 7, 9 and 14; and C.I. Food Blacks 1 and 2.

Specific examples of direct dyes include C.I. Direct Yellows 1, 12, 24, 26, 33, 44, 50, 86, 120, 132, 142 and 144; C.I. Direct Reds 1, 4, 9, 13, 17, 20, 28, 31, 39, 80, 81, 83, 89, 225 and 227; C.I. Direct Oranges 26, 29, 62 and 102; C.I. Direct Blues 1, 2, 6, 15, 22, 25, 71, 76, 79, 86, 87, 90, 98, 163, 165, 199 and 202; and C.I. Direct Blacks 19, 22, 32, 38, 51, 56, 71, 74, 75, 77, 154, 168 and 171.

Specific examples of basic dyes include C.I. Basic Yellows 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blues 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Blacks 2 and 8.

Specific examples of reactive dyes include C.I. Reactive Blacks 3, 4, 7, 11, 12 and 17, Reactive Yellows 1, 5, 11, 13, 14, 20, 21, 22, 25, 40, 47, 51, 55, 65 and 67; C.I. Reactive reds 1, 14, 17, 25, 26, 32, 37, 44, 46, 55, 60, 66, 74, 79, 96 and 97; and C.I. Reactive Blues 1, 2, 7, 14, 15, 23, 32, 35, 38, 41, 63, 80 and 95.

Among them, acid dyes and direct dyes are most preferred.

The content of the colorant in the recording ink is preferably 0.5% by mass to 15% by mass, more preferably 5% by mass to 12 by mass. When the content of the colorant is less than 0.5% by mass, the tinting strength is likely to be insufficient. On the other hand, when the content is more than 15% by mass, the hue change is disadvantageously remarkable, thus beautiful color may not be obtained.

The recording ink of the invention can be obtained by incorporating in the composition of the recording ink a wetting agent which is easily hydrogen-bonded and has not only a high viscosity as a simple substance, but also a high equilibrated water content and in which the viscosity thereof is lowered in the presence of water.

Examples of the polyhydric alcohol include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-ethyl-2,4-pentanediol, polyethylene glycol, 1,2,4-butanetriol and 1,2,6-hexanetriol. Among them, glycerin is important to be incorporated in the wetting agent in an amount of 20% by mass or more, since glycerin has a high effect of preventing the growth of the particle size by suppressing the coagulation of the colorant, while the viscosity thereof is rapidly elevated accompanying with the moisture evaporation Further, glycerin is preferred also from the viewpoint of the equilibrated water content.

As a wetting agent used in combination with glycerin, 1,3-butanediol is preferred. 1,3-Butanediol has a high equilibrated water content, like glycerin and has not only high reliability, but also high effects for uniformizing the spread of the image elements at the attaching of the recording ink to a recording paper and for retaining the colorant within the surface of the recording paper. While glycerin has also high effect for improving the reliability of the recording ink, when glycerin is used in a large amount, the image quality is impaired and the viscosity elevating rate of the recording ink from which water has been evaporated becomes too large, thus the delivering stability of the recording ink is impaired sometimes. Therefore, the amount ratio (1,3-butanediol:glycerin) between 1,3-butanediol and glycerin is preferably 15 to 5:1, ore preferably 1:1 to 4:1, still more preferably 1:1 to 3:1, most preferably 2:1 to 3:1.

The amount of the wetting agent in the recording ink is preferably 10% by mass to 50% by mass, ore preferably 25% by mass to 35% by mass, based on the total mass of the recording ink. When the amount of the wetting agent is too small, the shelf stability and delivering stability of the recording ink is impaired, thus the clogging of the nozzle is easily caused. On the other hand, when the amount of the wetting agent is to large, the drying properties of the recording ink is impaired and the spread of the recording ink is caused at the interface between the letter and the paper or at the interface between colors, thus the quality of the image becomes impaired.

Examples of the surfactant include an anionic surfactant and a nonionic surfactant. Depending on the type of the colorant or the combination of a wetting agent and a water-soluble organic solvent, a surfactant which does not impair the dispersing stability of the recording ink can be selected.

Examples of the anionic surfactant include polyoxyethylene alkyl ether acetic acid salts, dodecylbenzene sulfonate salts, succinate ester sulfonic acid salts, laurylate salts and salts of a polyoxyethylene alkyl ether sulfate.

Examples of the nonionic surfactant include polyoxyethylene alkyl ethers, polyoxyethylene polyoxypropylene alkyl ethers, polyoxyethylene alkyl esters, polyoxyethylene polyoxypropylene alkyl esters, polyoxyethylenesorbitan aliphatic acid esters, polyoxyethylene alkylphenyl ethers, polyoxyethylene alkyl amines and polyoxyethylene alkyl amides.

These surfactants are easily commercially available from manufacturers, such as Nikko Chemicals co., ltd., Nihon-Emulsion Co., Ltd., Nippon Shokubai Co. Ltd., Toho Chemical Industry Co., Ltd., KAO Corporation, Adeka Clean Aid Co., Ltd., Lion Corporation, Aoki Oil Industrial Co., Ltd., and Sanyo Chemical Industries, Ltd.

An acetylene glycol surfactant is preferably used as a surfactant. Examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol. Commercially available examples of the acetylene glycol surfactant include Surfynols 104, 82 465, 485 and TG (trade names, by Air products and Chemicals, Inc., U.S.A.) Among them, particularly a recording ink comprising Surfynols 465, 104 or TG exhibits advantageous printing quality.

The surfactant is not restricted to the above-exemplified surfactants and the above-exemplified surfactants may be used individually or in combination. Even when a surfactant used individually can not be easily dissolved in the recording ink, by using a combination of the above-exemplified surfactants, the surfactant is rendered soluble in the recording ink and can be present stably in the recording ink.

Among the above-exemplified surfactants, most preferred is nonionic surfactants represented by the following formulas:

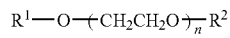

wherein $R^1$ represents any one of a carbon chain having a carbon number of 6 to 14 which may be branched and a perfluoroalkyl chain having a carbon number of 6 to 14; $R^2$ represents any one of a hydrogen atom and a carbon chain having a carbon number of 1 to 4 which may be branched; and "n" is an integer of 5 to 20.

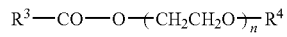

wherein $R^3$ represents a carbon chain having a carbon number of 6 to 14 which may be branched; $R^4$ represents any one of a hydrogen atom and a carbon chain having a carbon number of 1 to 4 which may be branched; and "n" is an integer of 5 to 20.

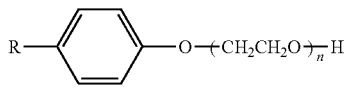

wherein R represents a carbon chain having a carbon number of 6 to 14 which may be branched; and is an integer of 5 to 20.

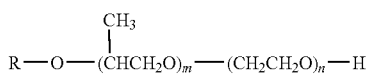

wherein R represents a carbon chain having a carbon number of 6 to 14 which may be branched; "m" is an integer of 5 to 10; "n" is an integer of 5 to 20; and the propylene glycol chain and the ethylene glycol chain may be produced according to a block polymerization or a random polymerization.

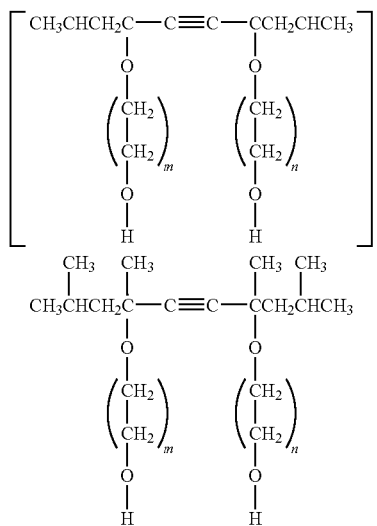

wherein "m" and "n" are respectively an integer of 5 to 20.

In nonionic surfactants represented by the formulas, examples of the carbon chains having a carbon number of 6 to 14 include hexyl, heptyl, octyl, nonyl, decyl, undecyl, dodecyl, tridecyl and tetradecyl.

Examples of the carbon chains having a carbon number of 1 to 4 include methyl, ethyl, propyl and butyl.

The amount of the surfactant in the recording ink is preferably 0.01% by mass to 5.0% by mass, more preferably 0.5% by mass to 3% by mass, still more preferably 0.5% by mass to 2.5% by mass, most preferably 0.8% by mass to 2.0% by mass, based on the total mass of the recording ink. When the amount of the surfactant is less than 0.01% by mass, the incorporating of the surfactant in the composition of the recording ink loses the effect thereof sometimes. On the other hand, when the amount of the surfactant is more than 5.0% by mass, the penetrating properties of the recording ink into a recording medium become higher than necessary penetrating properties, thus a disadvantage is likely to be caused wherein the image density is lowered or the show-through of the recording ink is caused.

As the penetrating agent, a polyol is preferred The polyol has a solubility in water at 20° C. of preferably 0.2% by mass to 5.0% by mass, more preferably 1.0% by mass to 5.0% by mass, still more preferably 1.0% by mass to 4.0% by mass.

Examples of an aliphatic diol among the above-noted polyols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol.

Among them, 2-ethyl-1,3-hexanediol and 2,2,4-trimethyl-1,3-pentanediol are most preferred.

Examples of the penetrating agent which may be used in combination with the polyol include alkyls and aryl ethers of polyhydric alcohols, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether and tetraethylene glycol chlorophenyl ether; and lower alcohols, such as ethanol. The penetrating agent is not restricted to the above-exemplified compounds so long as the penetrating agent can be dissolved in the recording ink and by incorporating the penetrating agent in the recording ink, the properties of the recording ink can be controlled to desired properties.

The amount of the penetrating agent in the recording ink is preferably 0.1% by mass to 5.0% by mass, more preferably 0.5% by mass to 4.0% by mass, still more preferably 1.0% by mass to 3.0% by mass, based on the total mass of the recording ink. When the amount of the penetrating agent is less than 0.1% by mass, rapid drying properties of the recording ink cannot be obtained, thus an image having a spread is formed sometimes. On the other hand, when the amount of the penetrating agent is more than 5.0% by mass, either the dispersing stability of the colorant is impaired thus the nozzle is easily clogged, or the penetrating properties of the recording ink into the recording medium becomes higher than necessary penetrating properties, a disadvantage is likely to be caused wherein the image density is lowered or the show-through of the recording ink is caused.

The other additives which are incorporated in the composition of the recording ink are not restricted and may be properly selected depending on the application. Examples thereof include antiseptic and antifungal agents, pH controlling agents, chelating agents and anti-corrosion agents.

Examples of the antiseptic and antifungal agents include sodium dehydroacetate, sodium sorbate, 2-pyridinethiol-1-oxide sodium, sodium benzoate and pentachlorophenol sodium.

The pH controlling agent is not restricted so long as the pH controlling agent can control the pH value of the recording ink to a desired value without affecting adversely the produced recording ink. Examples of the pH controlling agents include amines, such as diethanol amine and triethanol amine; hydroxides of alkali metal elements, such as lithium hydroxide, sodium hydroxide and potassium hydroxide; ammonium hydroxide; hydroxides of quaternary ammonium; hydroxides of quaternary phosphonium; and carbonates of alkali metals, such as lithium carbonate, sodium carbonate and potassium carbonate.

Examples of the chelating agents include ethylenediaminetetraacetic acid sodium nitrilotriacetic acid sodium hydroxyethylethylenediaminetriacetic acid sodium diethylenetriaminepentaacetic acid sodium and uramyldiacetic acid sodium.

Examples of the anti-corrosion agents include acidic sulfite salts, sodium thiosulfate, ammonium thiodiglycolate, diisopropylammonium nitrite, pentaerythritol tetranitrate, dicyclohexylammonium nitrite and benzotriazole.

The production method of the recording ink of the invention for the inkjet may be a conventional production method of an ink and comprises, for example mixing a wetting agent, a penetrating agent, a surfactant and water; stirring the resultant mixture for mixing uniformly the mixture; adding a pigment and a defoaming agent to the resultant mixture; and stirring the mixture, thereby obtaining a dispersion as the recording ink. Optionally, the obtained dispersion may be filtered for removing bulky particles or a foreign substance.

In the production method of the recording ink of the invention, the impurities are necessary to be removed from the produced recording ink of the invention. Examples of the impurities include (1) a contaminant invading from the manufacturing facility (e.g., a foreign substance, dust, residual material after the former production and soap) and (2) an impurity contained in raw materials (e.g., a residual monomer and a by-product).

Therefore, vessels for the production which are cleaned thoroughly are preferably used during the production of the recording ink for preventing the contamination by a dissolved or dispersed component which is different from components of the recording-ink composition and the surface of the vessels which is contacted with the recording ink is made of preferably a stainless steel, a glass or a fluorine-containing resin. Particularly preferably the vessel and piping for the production of the recording ink are thoroughly cleaned for preventing the contamination by a residual product of the recording ink which has been produced former and residual components of a cleaning liquid used for cleaning the production system is thoroughly rinsed. The used water is preferably an ion-exchanged water or pure water, since the recording ink is adversely affected easily by a multivalent metal ion.

A raw material used for the production of the recording ink is preferably a material containing a small amount of a by-product during producing the raw material or a residual material for producing the raw material. A raw material of the cosmetic grade which is produced through a well-cared product management is more preferably used than a raw material of the general industry grade containing the above-noted by-product emitting an odor. Further, the produced recording ink is preferably subjected to a filtration for removing bulky particles which are derived from a raw material for the production of the recording ink or are caused during the production of the recording ink.

The pore diameter of the filter for the filtration is preferably 0.5 μm to 10 μm, more preferably 3 μm to 7 μm from the viewpoint of the production efficiency and delivering reliability of the recording ink. Preferably, the resulting recording ink is filled in an ink cartridge after the recording ink is deaerated. Preferably, the recording ink has the concentration of the dissolved oxygen of 5 ppm or less.

(Inkjet Recording Method and Inkjet Recording Apparatus)

Hereinbelow, with respect to the first aspect of the inkjet recording method and inkjet recording apparatus of the invention, explanations are given.

Here, FIG. 1 is a view schematically showing an example of the main part of the inkjet recording apparatus of the invention. The inkjet recording apparatus 10 comprises the paper pressing roller 5 conveying the recording paper 7 which is an aspect of the recording medium, the paper conveying roller 6, the recording head 1 having a nozzle delivering the recording ink for the inkjet of the invention, the platen 2 which is an aspect of the heating unit and the paper pressing roller 4.

The recording head 1 delivers the recording ink of the invention from a nozzle and records on the printing surface or non-printing surface of the recording paper 7. The recording head 1 comprises, for example plural liquid-pressing spaces, a nozzle having a pore diameter of 35 μm or less and connected communicative to liquid-pressing spaces, an ink feeding path, a vibration plate and an electrical power-mechanical power exchanging unit driving the vibration plate. The recording head 1 is preferably so designed that the recording head 1 delivers plural ink drops continuously, thus plural ink drops are merged before the ink drops attach to a recording medium, thereby forming a large ink drop, since thereby, the delivering stability of a recording ink having even higher viscosities can be secured.

The platen 2 and the paper pressing roller 4 are a heating unit which heats the recording paper 7 to which the recording ink for the inkjet is attached by the heat of the platen 2 while putting the recording paper 7 between the platen 2 and the paper pressing roller 4. Here, the platen 2 is a roller having a hollow-cylindrical shape and is heated by the heat of the halogen heater 3 fitted in the inside of the platen 2.

The paper pressing roller 5 and the paper conveying roller 6 are a conveying unit which conveys the recording paper 7 by the rotation-driving of the paper conveying roller 6 in the direction of the paper discharge (the direction shown by the arrow in FIG. 1) while putting the recording paper 7 between the paper pressing roller 5 and the paper conveying roller 6.

According to an inkjet recording method using the inkjet recording apparatus 10, the recording using the recording ink for the inkjet of the invention is performed as follows.

(S11) The recording paper 7 is conveyed by the paper pressing roller 5 and the paper conveying roller 6 to the recording head 1.

(S12) The recording ink for the inkjet of the invention is delivered from the nozzle of the recording head 1 and is attached to a printing region or non-printing region of the recording paper 7, thereby performing the recording (image forming). Here, the recording ink is delivered from the nozzle before the moisture evaporation rate of the recording ink for the inkjet in the near of the nozzle becomes more than 30%. Thus, an image having high quality can be stably formed.

(S13) The recording paper 7 to which the recording ink for the inkjet is attached is conveyed to and put between the platen 2 and the paper pressing roller 4 and is heated by platen 2, followed by discharging the recording paper 7.

In the step (S12), the recording ink of the invention is used under the condition wherein the ink drop is delivered from the nozzle in the size of 3 pl to 40 pl and at the speed of 6 m/s to 20 m/s; the frequency is 1 kHz or more; and the resolution of the image is 300 dpi or more.

Next, with respect to the second aspect of the inkjet recording method and inkjet recording apparatus of the invention, explanations are given.

Figure 2:
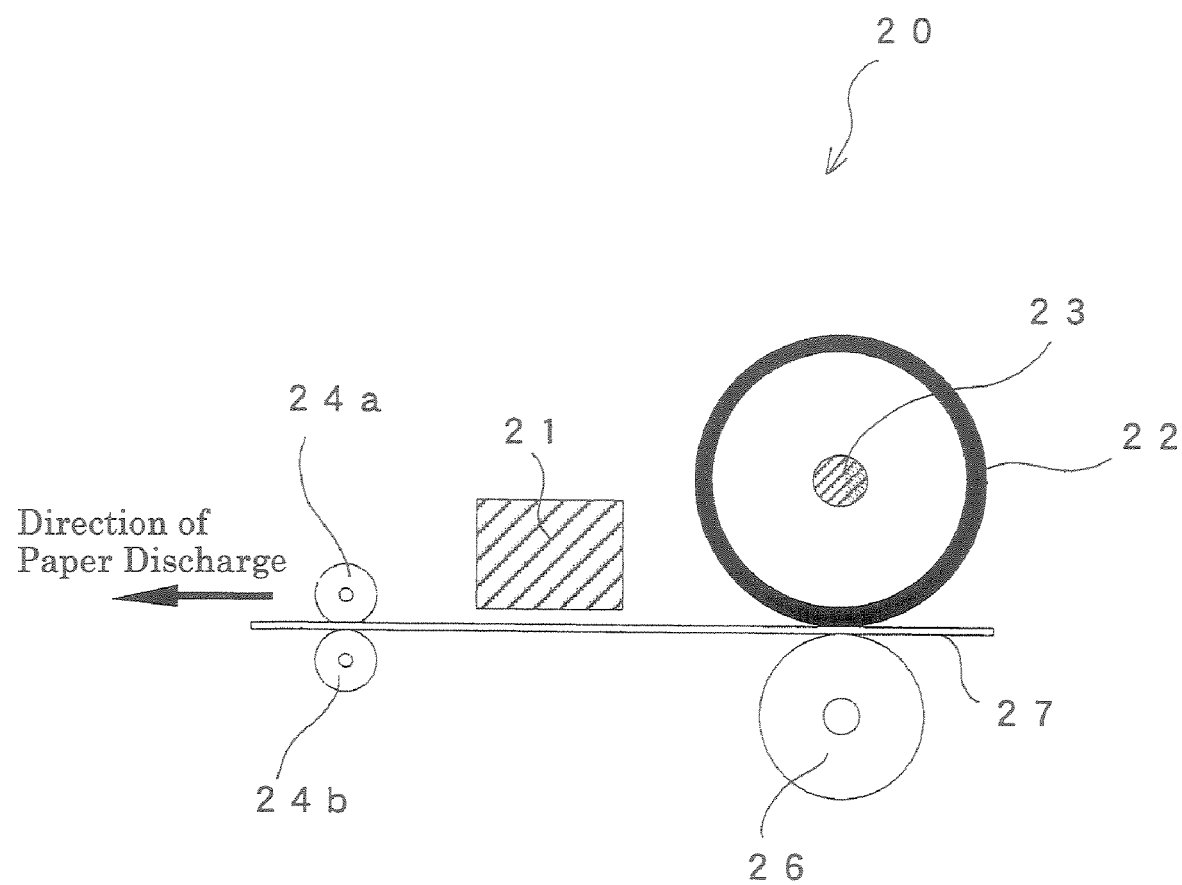
FIG. 2 is a view schematically showing an example of the composition of the inkjet recording apparatus according to the second embodiment of the invention.

Here, FIG. 2 is a view schematically showing an example of the main part of the inkjet recording apparatus of the invention. The inkjet recording apparatus 20 comprises the platen 22 conveying while heating the recording paper 27 which is an aspect of the recording medium, the paper conveying roller 26, the recording head 21 having a nozzle delivering the recording ink for the inkjet of the invention, and the paper pressing rollers 24a and 24b which lead the recording paper 27 to the direction of the paper discharge. Here, the recording head 21 has the same composition as that of the recording head 1 in the above-noted first aspect.

The platen 22 and the paper conveying roller 26 have both a heating function and a conveying function, wherein by the heating function, the recording paper 27 is heated by the heat of the platen 22 before attaching the recording ink thereto and while putting the recording paper 27 between the platen 22 and the paper conveying roller 26; and by the conveying function, the recording paper 27 is conveyed in the direction of the paper discharge (the direction shown by the arrow in FIG. 2). Here, the platen 22 is a roller having a hollow-cylindrical shape and is heated by the heat of the halogen heater 2, fitted in the inside of the platen 22.

According to an inkjet recording method using the inkjet recording apparatus 20, the recording using the recording ink for the inkjet of the invention is performed as follows.

(S21) The recording paper 27 is heated while putting the recording paper 27 between the platen 22 and the paper conveying roller 26 and is conveyed by the rotation driving of the paper conveying roller 26 to the recording head 21.

(S22) The recording ink for the inkjet of the invention is delivered from the nozzle of the recording head 21 and is attached to a printing region or non-printing region of the recording paper 27, thereby performing the recording (image forming) Here, the recording ink is delivered from the nozzle before the moisture evaporation rate of the recording ink for the inkjet in the near of the nozzle becomes more than 30%. Thus, an image having high quality can be stably formed.

(S23) The recording paper 27 to which the recording ink for the inkjet is attached for forming the image, is conveyed to the paper pressing rollers 24a and 24b and is led to the direction of the paper discharge by the paper pressing rollers 24a and 24b.

Next, with respect to the third aspect of the inkjet recording method and inkjet recording apparatus of the invention, explanations are given.

Figure 3:
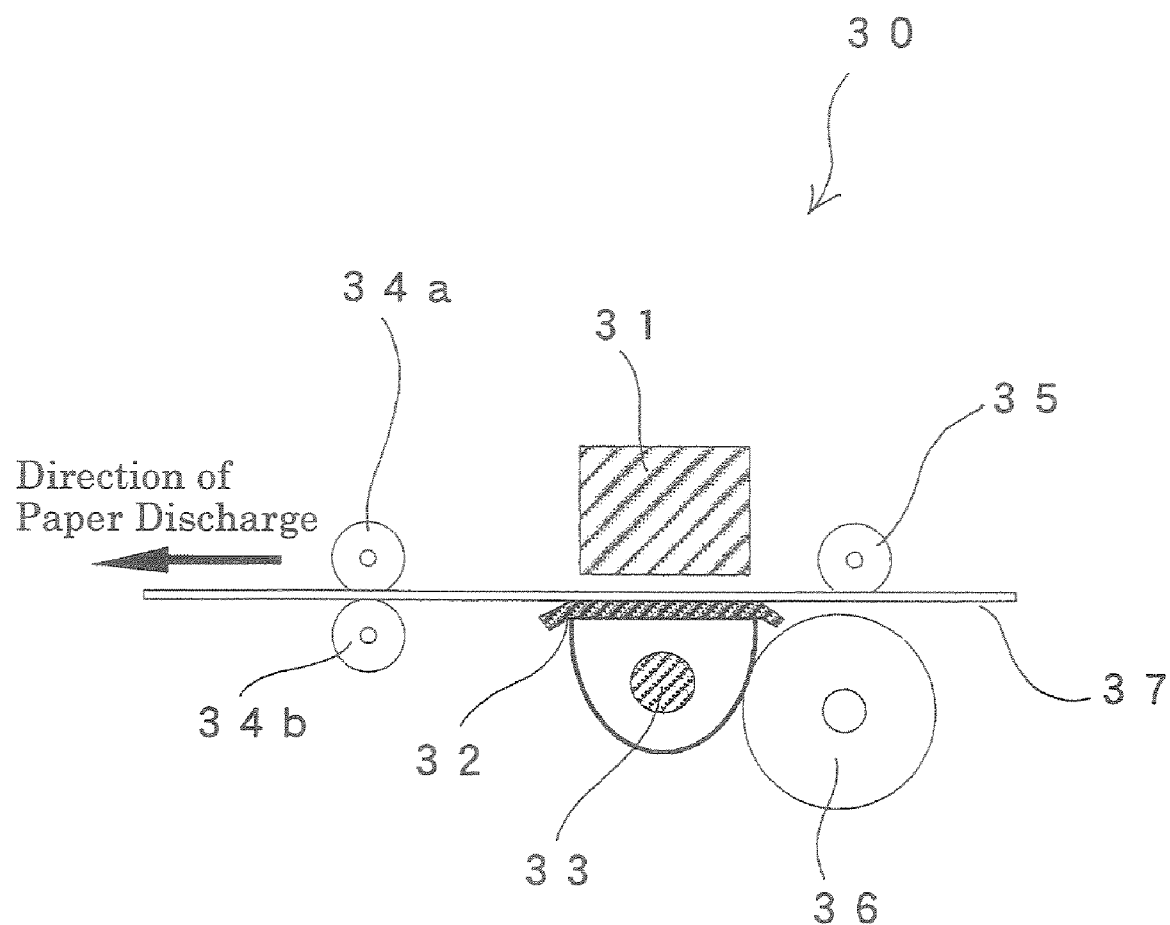
FIG. 3 is a view schematically showing an example of the composition of the inkjet recording apparatus according to the third embodiment of the invention.

Here, FIG. 3 is a view schematically showing an example of the main part of the inkjet recording apparatus of the invention The ink jet recording apparatus 30 comprises: the paper pressing roller 35 conveying the recording paper 37 which is an aspect of the recording medium; the paper conveying roller 36; the recording head 31 having a nozzle delivering the recording ink for the inkjet of the invention; the platen 32 which is arranged for heating the recording paper 37 in another side of the recording paper 37 than the side in which the recording head 31 is arranged; and the paper pressing rollers 34a and 34b which lead the recording paper 37 to the direction of the paper discharge. Here, the recording head 31 has the same composition as that of the recording head 1 in the above-noted first aspect and the paper pressing roller 35 and the paper conveying roller 36 have the same compositions respectively as those of the paper pressing roller 5 and the paper conveying roller 6.

The platen 32 is a heating unit which heats the recording paper 37 while attaching the recording ink for the inkjet thereto using the recording head 31 by contacting the platen 32 with the opposite surface to the printing surface of the recording paper 37. Here, the platen 32 is slid along the recording paper 37 and is heated by the heat of the halogen lamp 33 which is arranged in the near of the platen 32.

According to an inkjet recording method using the inkjet recording apparatus 30, the recording using the recording ink for the inkjet of the invention is performed as follows.

(S31) The recording paper 37 is conveyed by the paper pressing roller 35 and the paper convey ing roller 36 to the recording head 31.

(S32) While sliding the platen 32 along the recording paper 37 and heating the recording paper 37, the recording ink for the inkjet of the invention is delivered from the nozzle of the recording head 31 and is attached to a printing region or non-printing region of the recording paper 37, thereby performing the recording (image forming). Here, the recording ink is delivered from the nozzle before the moisture evaporation rate of the recording ink for the inkjet in the near of the nozzle becomes more than 30%. Thus, an image having high quality can be stably formed.

(S33) The recording paper 37 to which the recording ink for the inkjet is attached for forming the image, is conveyed to the paper pressing rollers 34a and 34b and is led to the direction of the paper discharge by the paper pressing rollers 34a and 34b.

In the invention, the drying rate of the recording ink for the inkjet is enhanced and the feathering, bleeding, cock-ring and show-through of the recording ink can be prevented by using the above-noted heating unit. Here, "drying" does not mean a state in which water is perfectly evaporated, but means a state in which a recording ink has lost water to some extent and lost fluidity and the recording ink is retained in the recording paper (recording medium) and does not move and flow. Applying an amount of heat to the recording paper is important, since the recording paper is heated for accelerating the moisture evaporation rate of the recording ink and whether the heat is applied before or after the printing is question less. Therefore, the inkjet recording apparatus and inkjet recording method of the invention may comprise either any one of the above-noted first to third aspects of the inkjet recording apparatus and inkjet recording method, or two or more of the above-noted first to third aspects.

By the above-noted inkjet recording apparatus and inkjet recording method, even using a heating unit applying a low amount of heat, an image having high quality can be formed thus the lowering of the reliability of the recording ink due to the heating of the head and ink by a radiation heat can be suppressed. Since the heating unit applies a low amount of heat, the consumption of the energy can be lowered, thus the inkjet recording apparatus and inkjet recording method of the invention is environment-friendly and the effect of shortening the warming-up time of the heating unit can be obtained.

(Ink Cartridge)

The ink cartridge of the invention comprises the recording ink of the invention held in a container and optionally other members selected properly.

The container is not restricted and the form, structure and size thereof may be properly selected depending on the application. Preferred example of the container include containers having at least an ink bag prepared using an aluminum laminated film or a resin film.

(Ink Record)

The record which is recorded by the inkjet recording apparatus and inkjet recording method of the invention is the ink record of the invention. The ink record of the invention comprises an image formed using the recording ink of the invention on a recording medium.

The recording medium is not restricted and may be properly selected depending on the application. Examples of the recording medium include plain papers, glossy papers, specified papers, clothes, films and OHP sheets. These recording media may be used individually or in combination.

The above-noted record has an image having high quality and no spread, is excellent in aging stability, thus can be applied preferably to various applications, such as documents in which various printings and images are recorded.

According to the invention, by prescribing so the recording ink for the inkjet comprising: a colorant which is dispersed in water; a wetting agent; a surfactant; a penetrating agent; and water that when the moisture evaporation rate is 30% to 50%, the viscosity of the recording ink is rapidly elevated or the viscosity elevating rate exceeds 500 using an inkjet recording apparatus equipped with a heating unit, the quality of the image can be improved by applying a low amount of heat to a recording medium. Also, by prescribing so the recording ink that when the moisture evaporation rate is less than 30%, the viscosity elevating rate is 10 or less and the change in the average particle diameter is suppressed to small, the reliability of the recording ink for a short term or long term can be secured.

Further, since an image having high quality can be formed using the recording ink, inkjet recording method and inkjet recording apparatus of the invention only by applying a low amount of heat, the lowering of the reliability of the recording ink can be suppressed, wherein the reliability of the recording ink is lowered by heating the inkjet head or recording ink with a radiation heat. The consumption of the energy can be lowered since the heating unit applies a low amount of heat, thus the inkjet recording apparatus and inkjet recording method of the invention is environment-friendly and the effect of shortening the warming-up time of the heating unit can be obtained.

Hereinbelow, the invention will be described in more detail referring to Examples and Comparative Examples, which should not be construed as limiting the scope of the invention.

First, the result of studying the pigment suitability for the reliability of the recording ink for the inkjet which is the prerequisite of the invention is shown as Comparative Examples.

Comparative Example 1

The composition and production method of the recording ink for the inkjet in Comparative Example 1 are shown as follows.

(1) Composition

| | |
|---|---|
| Pigment fine particles (trade name: CAB-O-JET 300; by Cabot Co.; a carbon black subjected to a treatment in which at least one of hydrophilic groups is bonded to the surface of the carbon black directly or through another group) | 50.0% by mass |
| Wetting agent (diethylene glycol) | 12.0% by mass |
| Wetting agent (glycerin) | 24.0% by mass |
| Penetrating agent (diethylene glycol monobutyl ether) | 2.0% by mass |
| Surfactant (trade name: Dinol 604; by Shin-Etsu Chemical Industries Co., Ltd.) | 1.0% by mass |
| Deforming agent (trade name: silicone KS 508; by Shin-Etsu Chemical Industries Co., Ltd.) | 0.1% by mass |
| Water (pure water) | 10.9% by mass |

(2) Production Method

First, a wetting agent, a penetrating agent, a surfactant and water were mixed and the resultant mixture was stirred for 1 hour, thereby mixing uniformly the mixture. Next, to the mixture, a pigment and a deforming agent were added and the resultant mixture was stirred for 1 hour. Then, the resultant dispersion was subjected to a pressure filtration using a cellulose-acetate membrane filter having an average pore diameter of 0.8 μm for removing bulky particles and foreign substances, thereby preparing a recording ink used for the evaluation.

Comparative Example 2

The recording ink of Comparative Example 2 was produced in substantially the same manner as in Comparative Example 1, except that the type and amount of pigment fine particles, the amount of the wetting agent of diethylene glycol, the amount of the wetting agent of glycerin and the amount of pure water were changed respectively to the below-described dispersion of polymer fine particles containing a pigment and 45.0 by mass, 14.7% by mass 29.3 by mass and 7.9% by mass.

(Preparing of Polymer Solution A)

The inside of a 1 L flask equipped with a mechanical stirrer, a thermometer, a nitrogen gas introducing tube, a refluxing tube and a dropping funnel was fully purged with nitrogen gas and into the flask, 11.2 g of styrene, 2.8 g of acrylic acid, 12.0 g of lauryl methacrylate, 4.0 g of polyethylene glycol methacrylate, 4.0 g of styrene macromer and 0.4 g of mercaptomethanol were charged and mixed, followed by elevating the temperature of the flask to 65° C.

Next, a solution mixture of 100.8 g of styrene, 25.2 g of acrylic acid, 108.0 g of lauryl methacrylate, 36.0 g of polyethylene glycol methacrylate, 60.0 g of hydroxylethyl methacrylate, 36.0 g of styrene macromer, 3.6 g of mercaptoethanol, 2.4 g of azobismethylvaleronitrile and 18 g of methyl ethyl ketone was dropped into the flask during 2.5 hours After the completion of the dropping, a solution mixture of 0.8 g of azobismethylvaleronitrile and 18 g of methyl ethyl ketone was dropped into the flask during 0.5 hour. At 65° C., the content of the flask was aged for 1 hour and 0.8 g of azobismethylvaleronitrile was added into the flask, followed by aging the content of the flask for 1 hour. After the completion of the reaction, 364 g of methyl ethyl ketone was added into the ask, thereby preparing 800 of the polymer solution A having a resin content of 50%.

(Preparing of Aqueous Dispersion of Polymer Fine Particles Containing Pigment)

28 g of the polymer solution A, 26 g of C.I. Pigment blue 15:3, 13.6 g of a 1 mol/L aqueous solution of potassium hydroxide, 20 g of methyl ethyl ketone and 13.6 g of an ion-exchanged water were mixed and stirred thoroughly, and the resultant mixture was kneaded using a roll mill, thereby obtaining a paste. The obtained paste was charged into 200 g of pure water and the resultant mixture was thoroughly stirred, followed by distilling-off methyl ethyl ketone and water from the mixture using an evaporator, thereby obtaining an aqueous dispersion of cyan-polymer fine particles (dispersion of polymer fine particles containing a pigment).

Comparative Example 3

The recording ink of Comparative Example 3 was produced in substantially the same manner as in Comparative Example 1, except that the type and amount of pigment fine particles, the amount of the wetting agent of diethylene glycol, the amount of the wetting agent of glycerin, the type of the surfactant and the amount of pure water were changed respectively to the below-described dispersion of pigment-resin and 38.7% by mass, 11.3% by mass, 22.7% by mass, a surfactant Softanol (by Nippon Shokubai Co., Ltd.) and 24.2% by mass.

(Preparing of Polymer Solution B)

Into a 1 L separable flask equipped with a mechanical stirrer, a thermometer, a nitrogen gas introducing tube and a refluxing tube, 49.6 g of fumaric acid, 169 g of bisphenol A-dihydroxyethyl, 31.7 g of phthalic anhydride and 0.7 g of paratoluene sulfonic acid were charged and the resultant mixture was subjected to a condensation reaction in a nitrogen stream at 150° C. for 2 hours and at 175° C. for 3 hours, thereby synthesizing a polyester resin. Into the reaction mixture containing a polyester resin, 678.8 g of water and 22.8 g of a 28% aqueous solution of ammonia were added and the resultant mixture was stirred at 65° C. for 2 hours. Next, to the resultant mixture, 47.5 g of acidic sodium sulfite was added and the resultant mixture was stirred at 95° C. for 6 hours thereby preparing 1,000 g of a transparent polymer solution having a resin content of 30%.

(Preparing of Dispersion of Pigment-Resin)

105 g of the polymer solution B, 100 g of ethylene glycol, 10.5 g of tetramethylsulfon, 136.3 g of pure water and 0.2 g of sodium hydroxide were thoroughly mixed and to the resultant mixture, 155 g of C.I. Pigment blue 15:2 were mixed while stirring the mixture, followed by dispersing the pigment in the mixture using a beads mill for 2 hours To the resultant mixture, 495 g of pure water was added and bulky particles in the resultant mixture were removed using an ultracentrifuge, thereby preparing a blue pigment-resin dispersion having a pigment content of 15.5%.

Comparative Example 4

The recording ink of Comparative Example 4 was produced in substantially the same manner as in Comparative Example 3, except that the type and amount of pigment fine particles, the amount of the wetting agent of diethylene glycol, the amount of the wetting agent of glycerin and the amount of pure water were changed respectively to the below-described pigment-surfactant dispersion and 42.5% by mass, 15.3% by mass, 30.7% by mass and 8.4% by mass.

(Preparing of Pigment-Surfactant Dispersion)

100 g of C.I. Pigment blue 15:3, 24.8 g of polyoxyethylene oleyl ether sulfuric acid ammonium and 175.2 g of pure water were mixed and the resultant mixture was subjected to a dispersing using a wet sand mill, then to the resultant mixture, 414.3 g of pure water was added and mixed, followed by subjecting the resultant mixture to a centrifuging for removing bulky particles from the mixture, thereby preparing a cyan pigment-surfactant dispersion.

The compositions of the recording inks produced in Comparative Examples 1 to 4 are shown in Table 1.

TABLE 1

| Component | Description | Comp. Ex. 1 | Comp. Ex. 2 | Comp. Ex. 3 | Comp. Ex. 4 |
|---|---|---|---|---|---|
| Pigment fine particles | CAB-O-JET300*[1] | 50.0 | | | |
| | Aqueous dispersion of polymer fine particles*[2] | | 45.0 | | |
| | Pigment-resin dispersion | | | 38.7 | |
| | Pigment-surfactant dispersion | | | | 42.5 |
| Wetting agent | Diethylene glycol | 12.0 | 14.7 | 11.3 | 15.3 |
| | Glycerin | 24.0 | 29.3 | 22.7 | 30.7 |
| Penetrating agent | Octanediol | | | 2.0 | 2.0 |
| | Diethylene glycol monobutyl ether | 2.0 | 2.0 | | |
| Surfactant | Softanol 70*[3] | | | 1.0 | 1.0 |
| | Dinol 604*[4] | 1.0 | 1.0 | | |
| Deforming agent | Silicone deformer KS 508*[5] | 0.1 | 0.1 | 0.1 | 0.1 |
| Water | Pure water | 10.9 | 7.9 | 24.2 | 8.4 |
| Total (% by mass) | | 100.0 | 100.0 | 100.0 | 100.0 |
| Properties | Viscosity (mPa·s) | 7.88 | 7.93 | 8.08 | 8.27 |
| | Particle diameter $D_{50}$(nm) | 106.3 | 119.6 | 98.6 | 114.5 |

*[1](trade name; by CABOT CORPORATION; a carbon black subjected to a treatment in which at least one of hydrophilic groups is bonded to the surface of the carbon black directly or through another group)
*[2]polymer fine particles containing a pigment
*[3](trade name; by Nippon Shokubai Co., Ltd.)
*[4](trade name; by Shin-Etsu Chemical Industries Co., Ltd.)
*[5](trade name; by Shin-Etsu Chemical Industries Co., Ltd.)

For evaluating the pigment suitability for the reliability of the recording ink, with respect to each of the recording inks produced in Comparative Examples 1 to 4, the change of the particle diameter according to the moisture evaporation was measured.

<Measurement of Change of Particle Diameter According to Moisture Evaporation>

A certain amount of each of the recording inks produced in Comparative Examples 1 to 4 was left to stand in an atmosphere having a temperature of 50° C. and a relative humidity of 10% and after the leaving for a certain time, the change of the mass of the recording ink and the particle diameter of the recording ink at that time were measured. The particle diameter was measured using a particle size distribution measuring apparatus (trade name: UPA 1150; by Micro Track Corp.) with respect to the diluted recording ink diluted by 500 times. The result of the measurement is shown in FIG. 4.

Figure 4:
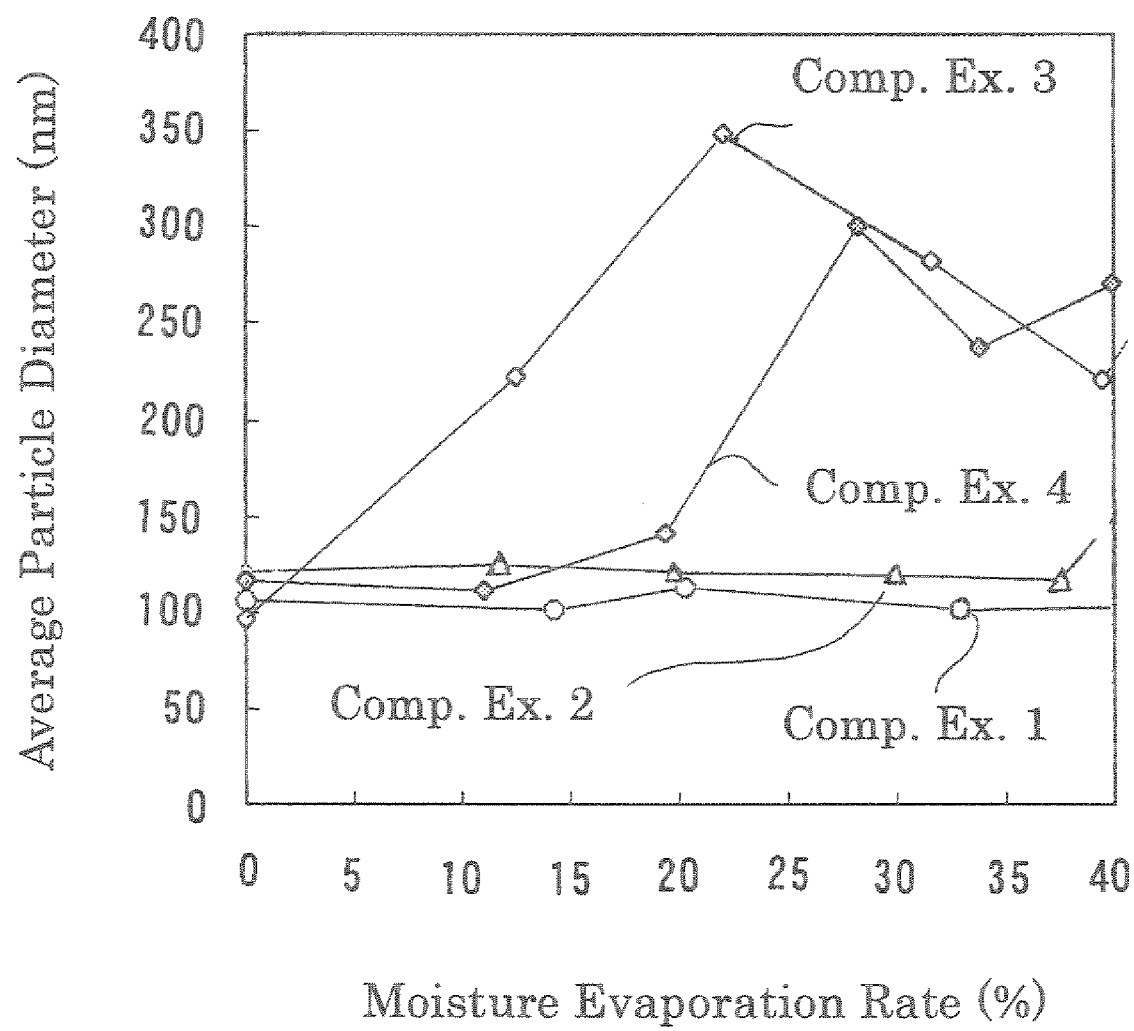
FIG. 4 is a graph showing the relationship between the moisture evaporation rate and the average particle diameter in Comparative Examples.

From the result shown in FIG. 4, it was found that when the moisture evaporation rate is 30%, a remarkable enlarging of the particle diameter is not caused with respect to the recording inks of Comparative Examples 1 and 25 thus when the recording inks of Comparative Examples 1 and 2 are delivered when the moisture evaporation rate is less than 30%, the delivering reliability of the recording ink is secured. On the other hand, with respect to the recording inks of Comparative Examples 3 and 4, even when the moisture evaporation rate is less than 30%, the particle diameter tends to be enlarged, thus it was found that when the moisture evaporation of the recording ink is accelerated at the meniscus portion due to the leaving-to-stand of the recording ink for a long term or due to the promotion of the drying of the recording ink by a heating unit, even when the moisture evaporation rate is a low value, the redispersibility of the pigment is lowered and the particle diameter of the pigment is enlarged, thus the delivering reliability of the recording ink is lowered.

Example 1

The composition and production method of the recording ink for the inkjet of Example 1 are shown as follows.

(1) Composition

| | |
|---|---|
| Pigment fine particles (trade name: CAB-O-JET 300; by Cabot Co.; a carbon black subjected to a treatment in which at least one of hydrophilic groups is bonded to the surface of the carbon black directly or through another group) | 50.0% by mass |
| Wetting agent (1,3-butylene glycol) | 23.3% by mass |
| Wetting agent (glycerin) | 7.7% by mass |
| Penetrating agent (diethylene glycol monobutyl ether) | 2.0% by mass |
| Surfactant (trade name: Dinol 604; by Shin-Etsu Chemical Industries Co., Ltd.) | 1.0% by mass |
| Deforming agent (trade name: silicone deformer KS 508; by Shin-Etsu Chemical Industries Co., Ltd.) | 0.1% by mass |
| Water (pure water) | 15.9% by mass |

(2) Production Method

First, a wetting agent, a penetrating agent, a surfactant and water were mixed and the resultant mixture was stirred for 1 hour, thereby mixing uniformly the mixture. Next, to the mixture, a pigment and a deforming agent were added and the resultant mixture was stirred for 1 hour. Then, the resultant dispersion was subjected to a pressure filtration using a cellulose-acetate membrane filter having an average pore diameter of 0.8 μm for removing bulky particles and foreign substances, thereby preparing a recording ink used for the evaluation.

Example 2

The recording ink of Example 2 was produced in substantially the same manner as in Example 1, except that the type and amount of the pigment fine particles, the amount of the wetting agent of 1,3-butylene glycol, the amount of the wetting agent of glycerin and the amount of pure water were changed to the dispersion of the polymer fine particle containing a pigment prepared in Comparative Example 2 and 45.0% by mass, 29.3% by mass 9.7% by mass and 12.9% by mass.

The compositions of the recording inks produced in Examples 1 and 2 are shown in Table 2.

TABLE 2

| Component | | Description | Example 1 | Example 2 |
|---|---|---|---|---|
| Pigment fine particles | | CAB-O-JET300*[1] | 50.0 | |
| | | Aqueous dispersion of polymer fine particles*[2] | | 45.0 |
| Wetting agent | | 1,3-butylene glycol | 23.3 | 29.3 |
| | | Glycerin | 7.7 | 9.7 |
| Penetrating agent | | Diethylene glycol monobutyl ether | 2.0 | 2.0 |
| Surfactant | | Dinol 604*[4] | 1.0 | 1.0 |
| Deforming agent | | Silicone deformer KS 508*[5] | 0.1 | 0.1 |
| Water | | Pure water | 15.9 | 12.9 |
| | Total (% by mass) | | 100.0 | 100.0 |
| Properties | Viscosity (mPa·s) | | 7.88 | 7.93 |
| | Particle diameter $D_{50}$(nm) | | 106.3 | 119.6 |

*[1](trade name; by CABOT CORPORATION; a carbon black subjected to a treatment in which at least one of hydrophilic groups is bonded to the surface of the carbon black directly or through another group)
*[2]polymer fine particles containing a pigment
*[4](trade name; by Shin-Etsu Chemical Industries Co., Ltd.)
*[5](trade name; by Shin-Etsu Chemical Industries Co., Ltd.)

With respect to each of the recording inks produced in Examples 1 and 2 and Comparative Examples 1 and 2, the viscosity elevating rate and change of particle diameter according to the moisture evaporation were measured as follows.

<Measurement of Viscosity Elevating Rate and Change of Particle Diameter According to Moisture Evaporation>

A certain amount of each of the recording inks produced in Examples and Comparative Examples was left to stand in an atmosphere having a temperature of 50° C. and a relative humidity of 10% and after the leaving for a certain time, the change of the mass as well as the viscosity (measured at 25° C.) and particle diameter of the recording ink were measured. The viscosity was measured using a viscometer (trade name: RL-500; by Toki Sangyo Co., Ltd.). The result of the measurement is shown in FIGS. 5 and 6.

Figure 5:
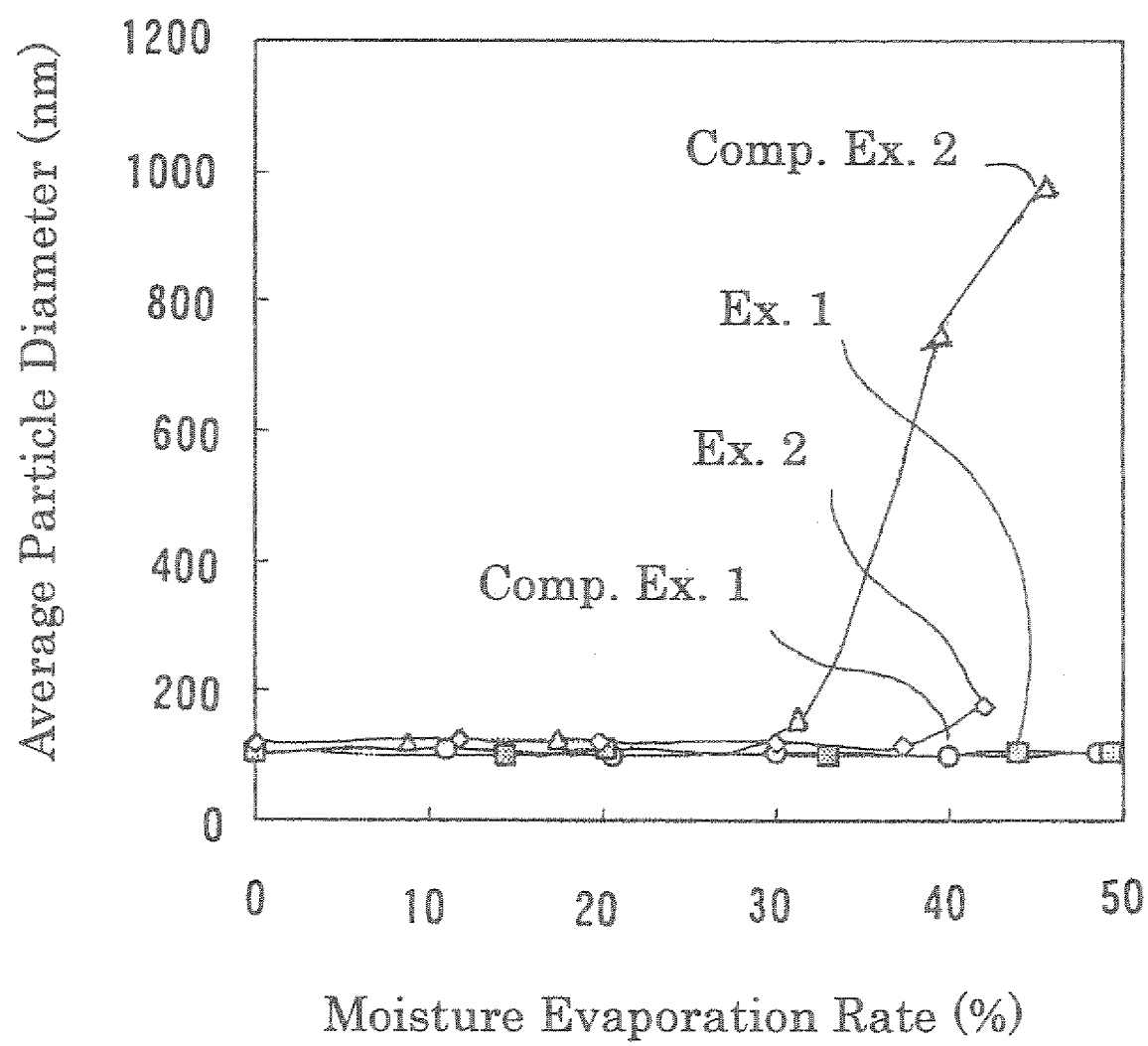
FIG. 5 is a graph showing the relationship between the moisture evaporation rate and the average particle diameter in Examples 1 and 2 and in Comparative Examples 1 and 2.
Figure 6:
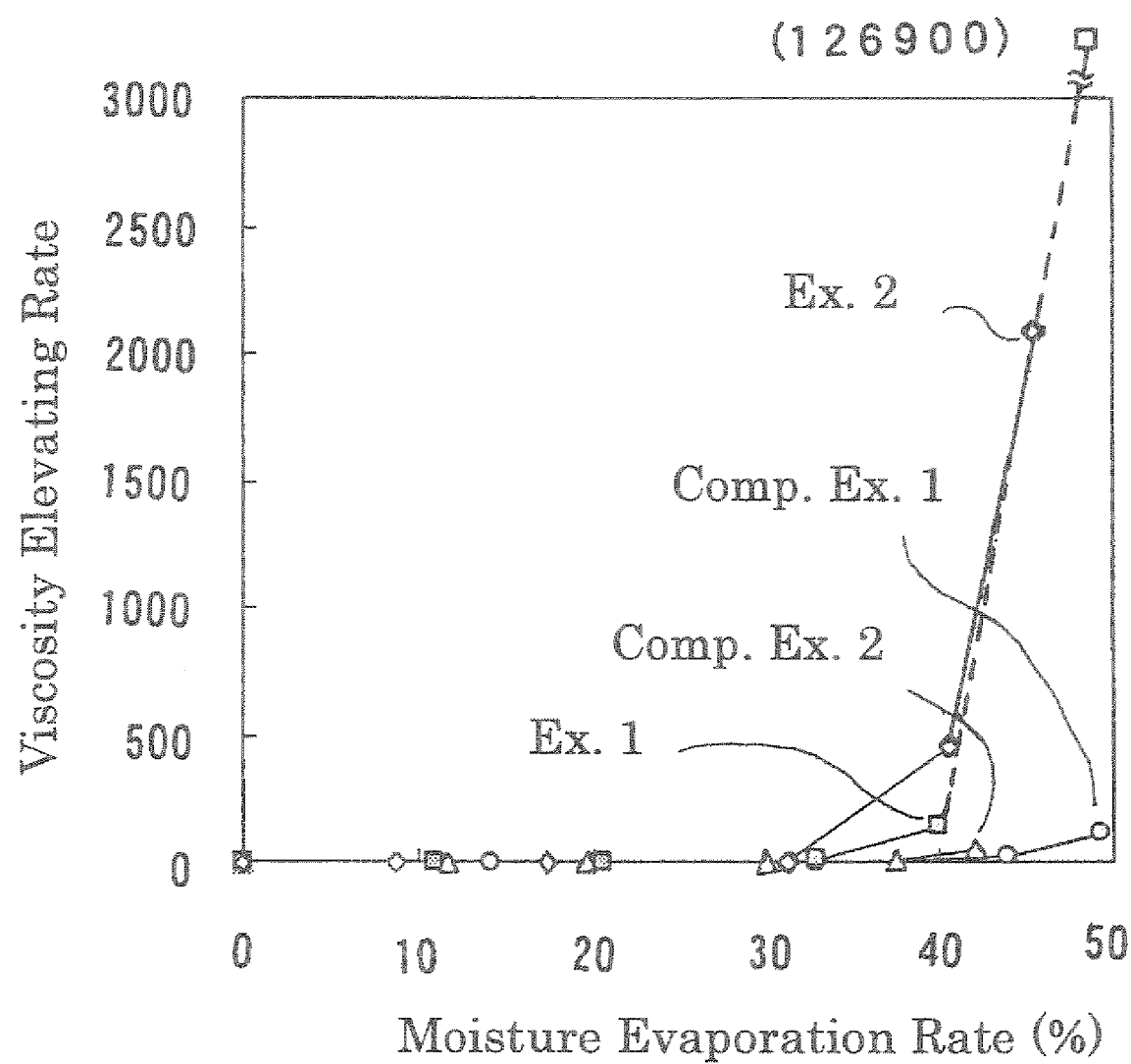
FIG. 6 is a graph showing the relationship between the moisture evaporation rate and the viscosity elevating rate in Examples 1 and 2 and in Comparative Examples 1 and 2.

From the result shown in FIGS. 5 and 6, it is found that when the moisture evaporation rate is 30% or less, with respect to the recording inks of Examples 1 and 2, like the recording inks of Comparative Examples 1 and 2, a remarkable enlarging of the particle diameter is not caused and the viscosity elevating rate is 10 or less, thus the delivering reliability of the recording inks of Examples 1 and 2 is secured to the same extent as that of the recording inks of Comparative Examples 1 and 2. However, when the moisture evaporation rate is 30% or more, a rapid viscosity elevating is caused. Such a property shows that when the moisture evaporation rate is 30% to 50%, the viscosity of the recording ink is elevated, thus the effect of suppressing the moving of the ink, such as the bleeding can be obtained. On the other hand, with respect to the recording inks of Comparative Examples 1 and 2, the elevating of the viscosity is not caused and it is shown that for obtaining the above-noted effect a more amount of the moisture evaporation is necessary.

With respect to each of the recording inks of Examples 1 and 2 and Comparative Examples 1 and 2, the printing quality was evaluated as follows.

<Evaluation of Printing Quality>

Using an inkjet recording apparatus having a composition shown in FIG. 1 which was prepared by converting the paper discharge part of an inkjet printer (trade name: EM-930 C, by Seiko Epson Co.) in such a manner that a heating unit in which a halogen heater was fitted in the inside of a platen produced by coating the surface of an aluminum plain tube with a silicone rubber was attached to the discharge part, the printing test was performed with respect to each of the recording inks of Examples 1 and 2 and Comparative Examples 1 to 4 and the quality of the recording ink was evaluated. The heating temperature was measured using a radiation thermometer as the temperature of the printing surface. Since the used inkjet printer was a serial printer, the heater contacting time was nonuniform and the temperature of the paper surface had a scatter. Thus, the temperature of the paper surface was measured as an average value of the temperature of the paper surface heated by the heater during the paper feeding without the printing.

The printing was performed by printing out a chart prepared by a word processor soft (Microsoft Word 2000) using a fine mode in which "without color correction" was selected by a driver attached to the printer as a printing mode. The result of the evaluation is shown in FIG. 7.

Figures 7, 8:
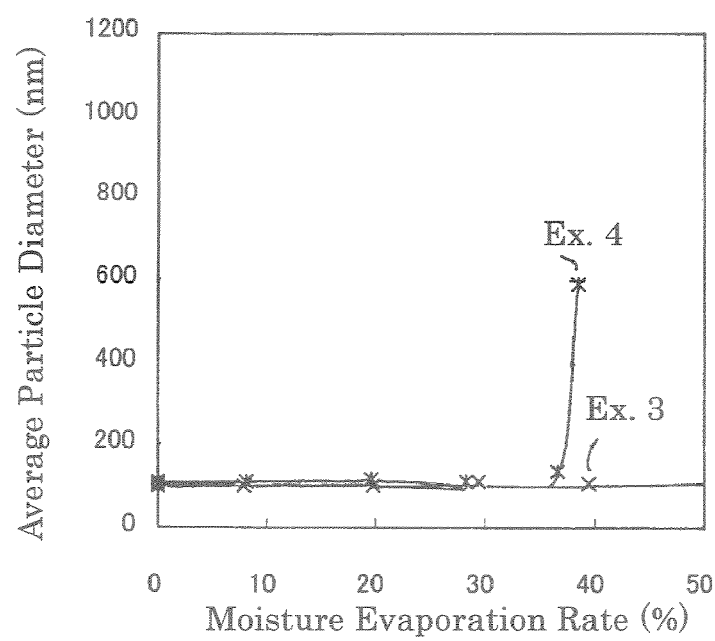
FIG. 7 is a view schematically showing the result of the printing test in Examples 1 and 2 and in Comparative Examples 1 and 2.
FIG. 8 is a graph showing the relationship between the moisture evaporation rate and the average particle diameter in Examples 3 and 4.

The printed images shown in FIG. 7 are enlarged images of the images which were printed out as images of a letter having a size of 6 point and were converted in the gray scale. The dense color corresponds to the recording inks of Example 1 and Comparative Example 1 and the dilute color corresponds to the recording inks of Example 2 and Comparative Example 2.

With respect to the ink set in combination of the recording inks of Examples 1 and 2, at the temperature of the paper surface of 45° C., the bleeding has begun to be suppressed thus the line width of the letter becomes less and the letter becomes sharp. On the other hand, with respect to the ink set in combination of the recording inks of Comparative Examples 1 and 2, even at the temperature of the paper surface of more than 60° C., the quality of the image is not improved and the effect for heating the paper surface cannot be observed.

Example 3

The recording ink of Example 3 was produced in substantially the same manner as in Example 1, except that the composition of the recording ink was changed to the following composition.

| | |
|---|---|
| Pigment fine particles (trade name: CAB-O-JET 300; by Cabot Co.; a carbon black subjected to a treatment in which at least one of hydrophilic groups is bonded to the surface of the carbon black directly or through another group) | 50.0% by mass |
| Wetting agent (3-methyl-1,3-butylene glycol) | 21.0% by mass |
| Wetting agent (glycerin) | 7.0% by mass |
| Penetrating agent (octanediol) | 2.0% by mass |
| Surfactant (trade name: FINESURF TDP-0107; by Aoki Oil Industrial Co., Ltd.) | 1.0% by mass |
| Deforming agent (trade name: silicone KS 508; by Shin-Etsu Chemical Industries Co., Ltd.) | 0.1% by mass |
| Water (pure water) | 18.9% by mass |

Example 4

The recording ink of Example 4 was produced in substantially the same manner as in Example 3, except that the type of pigment fine particles the amount of 3-methyl-1,3-butylene glycol as a wetting agent, the amount of glycerin as a wetting agent and the amount of the pure water were changed respectively to a dispersion of polymer fine particles containing a pigment prepared in Comparative Example 2, 50.0% by mass, 22.9% by mass, 7.6% by mass and 16.4% by mass.

The compositions of the recording inks produced in Examples 3 and 4 are shown in Table 3.

TABLE 3

| Component | Description | Example 3 | Example 4 |
|---|---|---|---|
| Pigment fine particles | CAB-O-JET300[*1] | 50.0 | |
| | Aqueous dispersion of polymer fine particles[*2] | | 50.0 |
| Wetting agent | 3-methyl-1,3-butylene glycol | 21.0 | 22.9 |
| | Glycerin | 7.0 | 7.6 |
| Penetrating agent | Octanediol | 2.0 | 2.0 |
| Surfactant | FINESURF TDP-0107[*3] | 1.0 | 1.0 |
| Deforming agent | Silicone deformer KS 508 | 0.1 | 0.1 |
| Water | Pure water | 18.9 | 16.4 |
| Total (% by mass) | | 100.0 | 100.0 |
| Properties | Viscosity (mPa·s) | 8.21 | 8.00 |
| | Particle diameter $D_{50}$(nm) | 111.2 | 116.6 |

[*1](trade name; by Cabot Co.; a carbon black subjected to a treatment in which at least one of hydrophilic groups is bonded to the surface of the carbon black directly or through another group)
[*2]polymer fine particles containing a pigment
[*3](trade name; by Aoki Oil Industrial Co., Ltd.)

Figure 9:
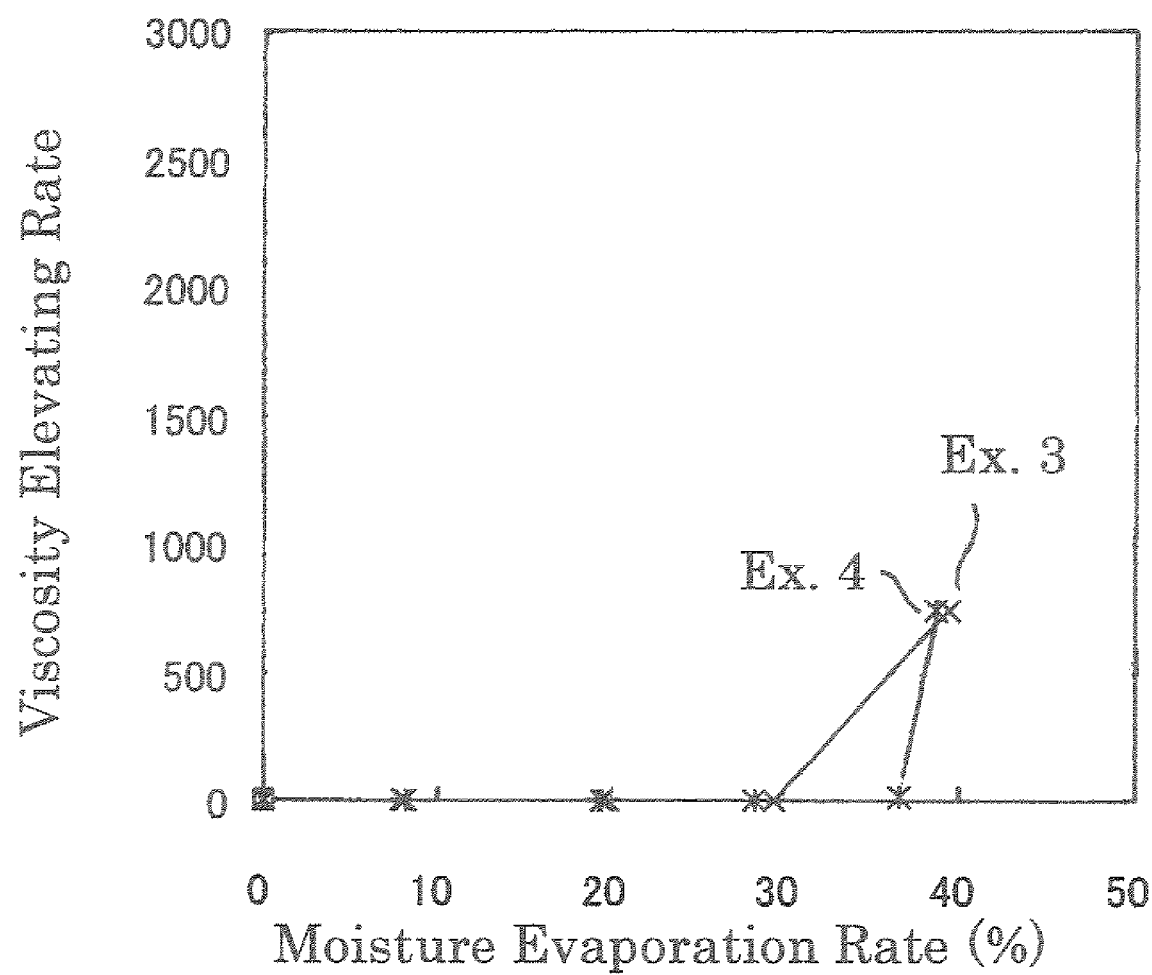
FIG. 9 is a graph showing the relationship between the moisture evaporation rate and the viscosity elevating rate in Examples 3 and 4.

With respect to each of the recording inks produced in Examples 3 and 4, the viscosity elevating rate and change of particle diameter according to the moisture evaporation were measured according to the same method as the above-noted method. The result of the measurement is shown in FIGS. 8 and 9. With respect to both of the recording inks produced in Examples 3 and 4, when the moisture evaporation rate is 30 or less, the viscosity elevating rate was 10 or less and when the moisture evaporation rate is 30% to 50%, there was a point at which the viscosity elevating rate is more than 500. Further, when the moisture evaporation rate is 30% or less, the average particle diameter of the colorant in the composition of the recording ink was two times or less the initial average particle diameter of the colorant.

With respect to each of the recording inks for the inkjet produced in Examples 3 and 4, the printing quality was evaluated according to the same method as the above-noted method and as the result of the evaluation it was found that also with respect to the ink set in combination of the recording ink of Example 3 and the recording ink of Example 4, the bleeding is suppressed and the printing result in which the line width of the letter becomes less and the letter becomes sharp, could be obtained.

The invention claimed is:
1. A recording ink comprising:
a colorant,
a wetting agent,
a surfactant,
a penetrating agent, and
water,
wherein when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30% to 50%, there appears a point at which the viscosity elevating rate is more than 500; and when the moisture evaporation rate is less than 30%, the average particle diameter of the colorant in the recording ink is two times or less the initial average particle diameter of the colorant before the moisture evaporation of the recording ink,

$$\text{Moisture evaporation rate}(\%) = [(W_A - W_B)/W_A] \times 100 \quad \text{<Numerical formula 1>}$$

wherein $W_A$ represents an initial mass (g) of the recording ink before the moisture evaporation and $W_B$ represents a mass (g) of the recording ink after the moisture evaporation, $$\text{Viscosity elevating rate} = V_B/V_A \quad \text{<Numerical formula 2>}$$

wherein $V_A$ represents an initial viscosity (mPa·s) of the recording ink before the moisture evaporation and $V_B$ represents a viscosity (mPa·s) of the recording ink after the moisture evaporation.

2. The recording ink according to claim 1, wherein the colorant comprises pigment fine particles.

3. The recording ink according to claim 2, wherein the colorant comprises pigment fine particles having at least one hydrophilic group in the surface thereof and exhibits at least one of water-dispersibility and water-solubility in the absence of dispersing agent.

4. The recording ink according to claim 1, wherein the colorant is a polymer emulsion of which the polymer fine particles contain one selected from the group consisting of a water-insoluble colorant and a water poor-soluble colorant.

5. The recording ink according to claim 1, wherein the wetting agent is at least two types of polyhydric alcohols having an equilibrated water content of 25% by mass or more under a condition of temperature 20° C. and relative humidity 60%.

6. The recording ink according to claim 5, wherein one of the polyhydric alcohols is glycerin and the content of glycerin is 50% by mass or less in the wetting agent.

7. The recording ink according to claim 1, wherein the penetrating agent is a polyol having a solubility of 0.2% by mass to 5.0% by mass in water at temperature 20° C.

8. The recording ink according to claim 1, wherein the surfactant is a nonionic surfactant.

9. The recording ink according to claim 8, wherein the nonionic surfactant is a compound represented by the following formulas:

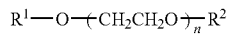

wherein $R^1$ represents a carbon chain having a carbon number of 6 to 14 which may be branched and a perfluoroalkyl chain having a carbon number of 6 to 14; $R^2$ represents a hydrogen atom or a carbon chain having a carbon number of 1 to 4 which may be branched; and n is an integer of 5 to 20,

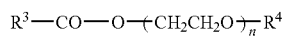

wherein $R^3$ represents a carbon chain having a carbon number of 6 to 14 which may be branched; $R^4$ represents a hydrogen atom or a carbon chain having a carbon number of 1 to 4 which may be branched; and n is an integer of 5 to 20,

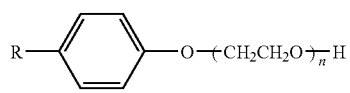

wherein R represents a carbon chain having a carbon number of 6 to 14 which may be branched; and n is an integer of 5 to 20,

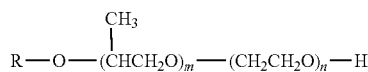

wherein R represents a carbon chain having a carbon number of 6 to 14 which may be branched; m is an integer of 5 to 10; n is an integer of 5 to 20; and the propylene glycol chain and the ethylene glycol chain may be produced according to a block polymerization or a random polymerization,

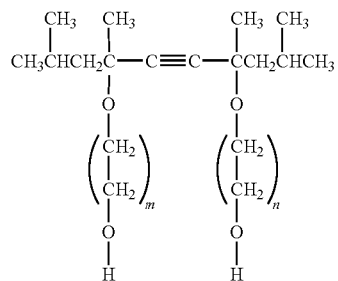

wherein m and n respectively are an integer of 5 to 20.

10. The recording ink according to claim 1, wherein the recording ink comprises 0.5% by mass to 15% by mass of the colorant, 10% by mass to 50% by mass of the wetting agent, 0.01% by mass to 5% by mass of the surfactant and 0.1% by mass to 5% by mass of the penetrating agent.

11. An inkjet recording method comprising:
delivering a recording ink from a nozzle, and
recording an image by attaching the recording ink to a printing region or non-printing region of a recording medium,
wherein before the moisture evaporation rate of the recording ink in the near of the nozzle becomes more than 30%, the recording ink is delivered from the nozzle, and
wherein the recording ink comprises: a colorant, a wetting agent, a surfactant, a penetrating agent, and water,
wherein when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30% to 50%, there appears a point at which the viscosity elevating rate is more than 500; and when the moisture evaporation rate is less than 30%, the average particle diameter of the colorant in the recording ink is two times or less the initial average particle diameter of the colorant before the moisture evaporation of the recording ink, Moisture evaporation rate(%)=[($W_A-W_B$)/$W_A$]× 100   <Numerical formula 1> wherein $W_A$ represents an initial mass (g) of the recording ink before the moisture evaporation and $W_B$ represents a mass (g) of the recording ink after the moisture evaporation, Viscosity elevating rate=$V_B/V_A$   <Numerical formula 2> wherein $V_A$ represents an initial viscosity (mPa·s) of the recording ink before the moisture evaporation and $V_B$ represents a viscosity (mPa·s) of the recording ink after the moisture evaporation.

12. The inkjet recording method according to claim 11, wherein the recording is performed by at least one of:
heating the recording medium after the recording ink is attached to the recording medium,
attaching the recording ink to the recording medium after the recording medium is heated, and
attaching the recording ink to the recording medium while heating the recording medium.

13. An inkjet recording apparatus comprising:

a recording head having a nozzle configured to deliver a recording ink to a recording medium, and a heating unit configured to heat the recording medium, wherein the inkjet recording apparatus performs the recording in the recording medium by means of an inkjet recording method which comprises: delivering the recording ink from the nozzle, and recording an image by attaching the recording ink to a printing region or non-printing region of the recording medium, wherein before the moisture evaporation rate of the recording ink in the near of the nozzle becomes more than 30%, the recording ink is delivered from the nozzle, and wherein the recording ink comprises: a colorant, a wetting agent, a surfactant, a penetrating agent, and water, wherein when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30% to 50%, there appears a point at which the viscosity elevating rate is more than 500; and when the moisture evaporation rate is less than 30%, the average particle diameter of the colorant in the recording ink is two times or less the initial average particle diameter of the colorant before the moisture evaporation of the recording ink, $$\text{Moisture evaporation rate}(\%) = [(W_A/W_B)/W_A] \times 100 \qquad \text{<Numerical formula 1>}$$

wherein $W_A$ represents an initial mass (g) of the recording ink before the moisture evaporation and $W_B$ represents a mass (g) of the recording ink after the moisture evaporation, $$\text{Viscosity elevating rate} = V_B/V_A \qquad \text{<Numerical formula 2>}$$

wherein $V_A$ represents an initial viscosity (mPa·s) of the recording ink before the moisture evaporation and $V_B$ represents a viscosity (mPa·s) of the recording ink after the moisture evaporation.

14. An ink cartridge comprising:

a container, and a recording ink held in the container, wherein the recording ink comprises a colorant, a wetting agent, a surfactant, a penetrating agent, and water, wherein when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30% to 50%, there appears a point at which the viscosity elevating rate is more than 500; and when the moisture evaporation rate is less than 30%, the average particle diameter of the colorant in the recording ink is two times or less the initial average particle diameter of the colorant before the moisture evaporation of the recording ink, $$\text{Moisture evaporation rate}(\%) = [(W_A/W_B)/W_A] \times 100 \qquad \text{<Numerical formula 1>}$$

wherein $W_A$ represents an initial mass (g) of the recording ink before the moisture evaporation and $W_B$ represents a mass (g) of the recording ink after the moisture evaporation, $$\text{Viscosity elevating rate} = V_B/V_A \qquad \text{<Numerical formula 2>}$$

wherein $V_A$ represents an initial viscosity (mPa·s) of the recording ink before the moisture evaporation and $V_B$ represents a viscosity (mPa·s) of the recording ink after the moisture evaporation.

15. An ink record comprising:

an image formed in a recording medium using a recording ink, wherein the recording ink comprises: a colorant, a wetting agent, a surfactant, a penetrating agent, and water, wherein when the moisture evaporation rate of the recording ink which is represented by the following numerical formula 1 is less than 30%, the viscosity elevating rate of the recording ink which is represented by the following numerical formula 2 is 10 or less; when the moisture evaporation rate is 30% to 50%, there appears a point at which the viscosity elevating rate is more than 500; and when the moisture evaporation rate is less than 30%, the average particle diameter of the colorant in the recording ink is two times or less the initial average particle diameter of the colorant before the moisture evaporation of the recording ink, $$\text{Moisture evaporation rate}(\%) = [(W_A/W_B)/W_A] \times 100 \qquad \text{<Numerical formula 1>}$$

wherein $W_A$ represents an initial mass (g) of the recording ink before the moisture evaporation and $W_1$ represents a mass (g) of the recording ink after the moisture evaporation, $$\text{Viscosity elevating rate} = V_B/V_A \qquad \text{<Numerical formula 2>}$$

wherein $V_A$ represents an initial viscosity (mPa·s) of the recording ink before the moisture evaporation and $V_B$ represents a viscosity (mPa·s) of the recording ink after the moisture evaporation.

\* \* \* \* \*